(12) United States Patent
Xu et al.

(10) Patent No.: US 11,611,994 B2
(45) Date of Patent: Mar. 21, 2023

(54) RANDOM ACCESS METHOD, USER EQUIPMENT, AND NETWORK DEVICE

(71) Applicant: HUAWEI TECHNOLOGIES CO., LTD., Shenzhen (CN)

(72) Inventors: Haibo Xu, Beijing (CN); Zhenzhen Cao, Beijing (CN); Bingzhao Li, Beijing (CN); Chuting Yao, Beijing (CN); Xiangdong Zhang, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 16/764,771

(22) PCT Filed: Sep. 20, 2018

(86) PCT No.: PCT/CN2018/106635
§ 371 (c)(1),
(2) Date: May 15, 2020

(87) PCT Pub. No.: WO2019/095843
PCT Pub. Date: May 23, 2019

(65) Prior Publication Data
US 2021/0368545 A1    Nov. 25, 2021

(30) Foreign Application Priority Data
Nov. 15, 2017  (CN) .......................... 201711132847.5

(51) Int. Cl.
*H04W 74/08*    (2009.01)
*H04W 72/04*    (2009.01)

(52) U.S. Cl.
CPC ... *H04W 74/0833* (2013.01); *H04W 72/0406* (2013.01)

(58) Field of Classification Search
None
See application file for complete search history.

(56) References Cited

U.S. PATENT DOCUMENTS

| 2012/0250558 | A1 | 10/2012 | Chung et al. |
| 2016/0262187 | A1 | 9/2016 | Ohuchi et al. |

(Continued)

FOREIGN PATENT DOCUMENTS

| CN | 102149199 A | 8/2011 |
| CN | 103369611 A | 10/2013 |

(Continued)

OTHER PUBLICATIONS

R1-1718901 MediaTek "Summary of Bandwidth Part operation" 3GPP WG1 #90bis Prague Oct. 9-13, 2017 (Year: 2017).*

(Continued)

*Primary Examiner* — Basil Ma
(74) *Attorney, Agent, or Firm* — Leydig, Voit & Mayer, Ltd.

(57) ABSTRACT

A method and a device are provided. The method includes: selecting, by user equipment, a random access preamble from a random access preamble set, and selecting a random access channel resource from a random access channel resource set; sending, by the user equipment, the random access preamble by using the random access channel resource; and receiving, by the user equipment, a random access response message on a first downlink bandwidth part; wherein at least one of the random access preamble set or the random access channel resource set corresponds to the first downlink bandwidth part, and the random access channel resource includes at least one of a random access channel time domain resource or a random access channel frequency domain resource.

14 Claims, 13 Drawing Sheets

(56) References Cited

U.S. PATENT DOCUMENTS

2019/0059112 A1\* 2/2019 Ou ............... H04W 74/0833
2020/0389282 A1\* 12/2020 Turtinen ............ H04W 74/02

FOREIGN PATENT DOCUMENTS

| CN | 103458528 A | 12/2013 |
| CN | 105474725 A | 4/2016 |
| KR | 20120139820 A | 12/2012 |
| RU | 2532411 C1 | 11/2014 |
| WO | 2009140904 A1 | 11/2009 |
| WO | 2011046377 A2 | 4/2011 |
| WO | 2013049768 A1 | 4/2013 |
| WO | 2013169468 A1 | 11/2013 |

OTHER PUBLICATIONS

R1-1717077 (Huawei), R1-1717675 (Samsung), R1-1717905 (Huawei) 3GPP WG1 #90bis Prague Oct. 9-13, 2017 (Year: 2017).\*
R2-1710217 Huawei "User plane impacts for Bandwidth Parts" 3GPP WG2 #99bis Oct. 9-13, 2017 (Year: 2017).\*
"Presentation of Specification/Report to TSG:TS 38.321, Version 1.0.0," 3GPP TSG-RAN Meeting #77, Sapporo, Japan, RP-171733, Total 1 page, 3rd Generation Partnership Project, Valbonne, France (Sep. 11-14, 2017).
"3rd Generation Partnership Project; Technical Specification Group Radio Access Network; NR; Medium Access Control (MAC) protocol specification (Release 15)," 3GPP TS 38.321 V1.0.0, pp. 1-46, 3rd Generation Partnership Project, Valbonne, France (Sep. 2017).
"3rd Generation Partnership Project; Technical Specification Group Radio Access Network; NR; Radio Resource Control (RRC); Protocol specification (Release 15)," 3GPP TS 38.331 V0.1.0, pp. 1-42, 3rd Generation Partnership Project, Valbonne, France (Oct. 2017).
"3rd Generation Partnership Project; Technical Specification Group Radio Access Network; NR; NR and NG-RAN Overall Description; Stage 2 (Release 15)," 3GPP TS 38.300 V1.1.1, pp. 1-60, 3rd Generation Partnership Project, Valbonne, France (Oct. 2017).

Ericsson, "On bandwidth parts," 3GPP TSG-RAN WG1 #90, Prague, Czech Republic, R1-1712953, total 4 pages, 3rd Generation Partnership Project, Valbonne, France (Aug. 21-25, 2017).
"User plane impacts for Bandwidth Parts," 3GPP TSG-RAN WG2 #99bis, Prague, CZ, R2-1710217, pp. 1-6, 3rd Generation Partnership Project, Valbonne, France (Oct. 9-13, 2017).
"Summary of Bandwidth Part Operation," 3GPP TSG RAN WG1 Meeting 90bis, Prague, CZ, R1-1718839, pp. 1-13, 3rd Generation Partnership Project, Valbonne, France (Oct. 9-13, 2017).
Huawei et al., "Remaining issues on the PRACH for SUL," 3GPP TSG RAN WG1 Meeting #90bis, Prague, Czech Republic, R1-1717901, total 5 pages, 3rd Generation Partnership Project, Valbonne, France (Oct. 9-13, 2017).
LG Electronics, "RMSI delivery and CORESET configuration," 3GPP TSG RAN WG1 Meeting NR#3, Nagoya, Japan, R1-1715842, total 7 pages, 3rd Generation Partnership Project, Valbonne, France (Sep. 18-21, 2017).
Lenovo,"Random Access Procedure for NB-IoT," 3GPP TSG RAN WG1 Meeting #84, St. Julian's, Malta, R1-161009, total 4 pages, 3rd Generation Partnership Project, Valbonne, France (Feb. 15-19, 2016).
Samsung, "Random Access in RRC Connected: Bandwidth Part Aspects," 3GPP TSG RAN WG2 #99bis, Prague, Czech Republic, R2-1710091, total 3 pages, 3rd Generation Partnership Project, Valbonne, France (Oct. 9-13, 2017).
"On initial access for wideband carrier," 3GPP TSG RAN WG1 Meeting NR#3, R1-1715713, Nagoya, Japan, Total 4 pages, 3rd Generation Partnership Project, Valbonne, France (Sep. 18-21, 2017).
"Further consideration on NR RACH preamble sequence and preamble format for capacity enhancement," 3GPP TSG RAN WG1 Meeting NR#3, R1-1715789, Nagoya, Japan, pp. 1-28, 3rd Generation Partnership Project, Valbonne, France (Sep. 18-21, 2017).
Nokia, Nokia Shanghai Bell, "Remaining details on PRACH procedure," 3GPP TSG RAN WG1 Meeting 90bis, Prague, Czech Republic, R1-1718303, total 11 pages, 3rd Generation Partnership Project, Valbonne, France (Oct. 9-13, 2017).

\* cited by examiner

RANDOM ACCESS METHOD, USER EQUIPMENT, AND NETWORK DEVICE

CROSS-REFERENCE TO RELATED APPLICATIONS

This application is a national stage of International Application No. PCT/CN2018/106635, filed on Sep. 20, 2018, which claims priority to Chinese Patent Application No. 201711132847.5, filed on Nov. 15, 2017. Both of the aforementioned applications are hereby incorporated by reference in their entireties.

TECHNICAL FIELD

Embodiments of this application relate to communications technologies, and in particular, to a random access method, user equipment, and a network device.

BACKGROUND

In a 5G communications system, when bandwidth of a cell is large, user equipment may work on only a part of the bandwidth of the cell. Each part of the bandwidth of the cell is referred to as a bandwidth part. On a broadband carrier, a network device may configure one or more downlink bandwidth parts and one or more uplink bandwidth parts for one user equipment. A random access process in the 5G communications system may be performed based on the foregoing bandwidth part.

In the prior art, in a random access process based on a bandwidth part, a network device needs to send, on all configured downlink bandwidth parts, a random access response (RAR) and a physical downlink control channel (PDCCH) for scheduling Msg3 retransmission, to enable the UE to receive the RAR and the PDCCH for scheduling Msg3 retransmission.

However, the method in the prior art causes a severe waste of downlink resources.

SUMMARY

This application provides a random access method, user equipment, and a network device, to resolve a problem that downlink resources are wasted in a random access process in the prior art.

According to a first aspect, this application provides a random access method, and the method includes:

selecting, by user equipment, a random access preamble from a random access preamble set, and selecting a random access channel resource from a random access channel resource set;

sending, by the user equipment, the random access preamble by using the random access channel resource; and receiving, by the user equipment, a random access response message on a first downlink bandwidth part; where at least one of the random access preamble set or the random access channel resource set corresponds to the first downlink bandwidth part; and the random access channel resource includes at least one of a random access channel time domain resource or a random access channel frequency domain resource.

In the foregoing method, a correspondence between a downlink bandwidth part and a random access-related configuration is established, or a correspondence between a downlink bandwidth part and an uplink bandwidth part is established, so that the network device sends the random access response on only the downlink bandwidth part corresponding to the random access configuration based on the foregoing correspondence, thereby avoiding a waste of downlink resources.

Further, the first downlink bandwidth part is a downlink bandwidth part that is active when the user equipment performs the random access process.

Further, that at least one of the random access preamble set or the random access channel resource set corresponds to the first downlink bandwidth part includes:

at least one of the random access preamble set and the random access channel resource set corresponds to a first control resource set of the first downlink bandwidth part, and the first control resource set indicates a time-frequency domain resource set used by the user equipment to receive or search for a downlink control channel; where the downlink control channel is used to schedule any downlink transmission and/or uplink transmission; or the downlink control channel is used to schedule at least one of transmission of a random access process message 2, retransmission of a random access process message 3, and transmission of a random access process message 4, where the random access process message 2 is a random access response message, the random access process message 3 is uplink transmission scheduled for the first time, and the random access process message 4 is a random access contention resolution message.

In a possible design, the method further includes:

receiving, by the user equipment, a first message sent by a network device, where the first message includes configuration information indicating a correspondence between the first downlink bandwidth part and a first uplink bandwidth part and includes random access information of the first uplink bandwidth part, or the first message includes configuration information indicating a correspondence between the first downlink bandwidth part and random access information and includes a first uplink bandwidth part corresponding to the random access information; where the random access information includes at least one piece of the following information:

first configuration information of random access that is used to indicate a random access channel frequency domain resource;

second configuration information of random access that is used to indicate a random access channel time domain resource; and third configuration information of random access that is used to indicate a random access preamble set.

Further, the random access information includes only the first configuration information.

Correspondingly, the random access channel frequency domain resource in the random access channel resource set is the random access channel frequency domain resource indicated by the first configuration information;

the random access channel time domain resource in the random access channel resource set is the same as a random access channel time domain resource configured on a second uplink bandwidth part of the user equipment; and the random access preamble set is the same as a random access preamble set configured on the second uplink bandwidth part of the user equipment.

Further, the random access information includes only the second configuration information.

Correspondingly, the random access channel time domain resource in the random access channel resource set is the random access channel time domain resource indicated by the second configuration information;

the random access channel frequency domain resource in the random access channel resource set is N physical resource blocks in a center of the first uplink bandwidth part, where N is a predefined positive integer; and the random access preamble set is the same as a random access preamble set configured on a second uplink bandwidth part of the user equipment.

Further, the random access information of the first uplink bandwidth part includes only the third configuration information.

Correspondingly, the random access preamble set is the random access preamble set indicated by the third configuration information;

the random access channel frequency domain resource in the random access channel resource set is N physical resource blocks in a center of the first uplink bandwidth part, where N is a predefined positive integer; and the random access channel time domain resource in the random access channel resource set is the same as a random access channel time domain resource configured on a second uplink bandwidth part of the user equipment.

Further, the random access information of the first uplink bandwidth part includes the first configuration information and the second configuration information.

Correspondingly, the random access channel frequency domain resource in the random access channel resource set is the random access channel frequency domain resource indicated by the first configuration information;

the random access channel time domain resource in the random access channel resource set is the random access channel time domain resource indicated by the second configuration information; and the random access preamble set is the same as a random access preamble set configured on a second uplink bandwidth part of the user equipment.

Further, the random access information of the first uplink bandwidth part includes the first configuration information and the third configuration information that are of random access.

Correspondingly, the random access channel frequency domain resource in the random access channel resource set is the random access channel frequency domain resource indicated by the first configuration information;

the random access preamble set is the random access preamble set indicated by the third configuration information of random access; and the random access channel time domain resource in the random access channel resource set is the same as a random access channel time domain resource configured on a second uplink bandwidth part of the user equipment.

Further, the random access information of the first uplink bandwidth part includes the second configuration information and the third configuration information.

Correspondingly, the random access channel time domain resource in the random access channel resource set is the random access channel time domain resource indicated by the second configuration information;

the random access preamble set is the random access preamble set indicated by the third configuration information; and the random access channel frequency domain resource in the random access channel resource set is N physical resource blocks in a center of the first uplink bandwidth part, where N is a predefined positive integer.

Further, the random access information of the first uplink bandwidth part includes the first configuration information, the second configuration information, and the third configuration information.

Correspondingly, the random access channel frequency domain resource in the random access channel resource set is the random access channel frequency domain resource indicated by the first configuration information;

the random access channel time domain resource in the random access channel resource set is the random access channel time domain resource indicated by the second configuration information; and the random access preamble set is the random access preamble set indicated by the third configuration information.

Further, the second uplink bandwidth part is:

an initial uplink bandwidth part of the user equipment in a serving cell; or a first active uplink bandwidth part of the user equipment in the serving cell; or a default uplink bandwidth part of the user equipment in the serving cell; or an uplink bandwidth part configured or indicated by the network device for the user equipment by using dedicated signaling; where the serving cell is a serving cell in which the user equipment sends the random access preamble.

Further, the method includes:

sending, by the user equipment, the random access preamble on the first uplink bandwidth part by using the random access channel resource.

Further, the method includes:

if an uplink bandwidth part that is active when the user equipment performs the random access process is a third uplink bandwidth part, activating, by the user equipment, the first uplink bandwidth part and deactivating the third uplink bandwidth part, or switching, by the user equipment, from the third uplink bandwidth part to the first uplink bandwidth part; where correspondingly, the sending, by the user equipment, the random access preamble by using the random access channel resource includes:

sending, by the user equipment, the random access preamble on the first uplink bandwidth part by using the random access channel resource.

Further, the method includes:

if the random access process is a contention-based random access process, sending, by the user equipment, the random access process message 3 on the first uplink bandwidth part; and receiving, by the user equipment on the first downlink bandwidth part, a physical downlink control channel for scheduling retransmission of the random access process message 3 and transmission of a random access process message 4.

In a possible design, the first downlink bandwidth part is a downlink bandwidth part corresponding to a fourth uplink bandwidth part of the user equipment;

the fourth uplink bandwidth part is an uplink bandwidth part that is of the user equipment in a serving cell and on which a random access preamble set and a random access channel resource set are configured;

the random access preamble set is the random access preamble set configured on the fourth uplink bandwidth part;

the random access channel time domain resource in the random access channel resource set is a random access channel time domain resource configured on the fourth uplink bandwidth part;

the random access channel frequency domain resource in the random access channel resource set is a random access channel frequency domain resource configured on the fourth uplink bandwidth part; and correspondingly, the sending, by the user equipment, the random access preamble by using the random access channel resource includes:

sending, by the user equipment, the random access preamble on the fourth uplink bandwidth part by using the random access channel resource; where the serving cell is a serving cell in which the user equipment sends the random access preamble.

Further, a public configuration of the serving cell includes a configuration of the first downlink bandwidth part and a configuration of the fourth uplink bandwidth part.

The public configuration of the serving cell is included in system information transmitted on the first downlink bandwidth part.

Further, a public configuration or a dedicated configuration of the serving cell includes a configuration of the first downlink bandwidth part and a configuration of the fourth uplink bandwidth part.

The public configuration of the serving cell is sent by the network device to the user equipment by using dedicated signaling.

Further, the method includes:

when any one of the following conditions occurs, if an active uplink bandwidth part of the user equipment in the serving cell is a fifth uplink bandwidth part, activating, by the user equipment, the fourth uplink bandwidth part and deactivating the fifth uplink bandwidth part, or switching, by the user equipment, from the fifth uplink bandwidth part to the third uplink bandwidth part:

when a time alignment timer TAT associated with the serving cell of the user equipment expires;

when a quantity of times for which the user equipment sends a scheduling request reaches a maximum allowable transmission quantity;

when the user equipment receives signaling that is sent by the network device and that instructs the user equipment to initiate the random access process;

when the user equipment performs the random access process;

when the user equipment selects the random access preamble and the random access channel resource; and when the user equipment sends the random access preamble.

Further, the method includes:

when any one of the following conditions occurs, if an active downlink bandwidth part of the user equipment in the serving cell is a second downlink bandwidth part, activating, by the user equipment, the first downlink bandwidth part and deactivating the second downlink bandwidth part, or switching, by the user equipment, from the second downlink bandwidth part to the first downlink bandwidth part:

when the time alignment timer TAT of the user equipment expires;

when the quantity of times for which the user equipment sends the scheduling request reaches the maximum allowable transmission quantity;

when the user equipment receives the signaling that is sent by the network device and that instructs the user equipment to initiate the random access process;

when the user equipment performs the random access process;

when the user equipment starts to receive the random access response message; and when the user equipment completes sending of the random access preamble.

Further, the deactivating the second downlink bandwidth part, or switching, by the user equipment, from the second downlink bandwidth part to the first downlink bandwidth part includes:

if a first timer configured in the serving cell of the user equipment is running, stopping, by the user equipment, the first timer, or stopping and resetting, by the user equipment, the first timer, where the first timer is used to: if the first timer expires, the user equipment activates a default downlink bandwidth part in the serving cell, or the user equipment switches from an active downlink bandwidth part to the default downlink bandwidth part in the serving cell.

Further, the method includes:

starting or restarting, by the user equipment, the first timer when contention resolution in the random access process succeeds; or starting or restarting, by the user equipment, the first timer when successfully receiving the random access response message.

Further, the method includes:

if the random access is contention-based random access, sending, by the user equipment, a random access process message 3 on the fourth uplink bandwidth part; and receiving, by the user equipment on the first downlink bandwidth part, a physical downlink control channel for scheduling retransmission of the random access process message 3 and transmission of a random access process message 4.

In a possible design, the sending, by the user equipment, the random access preamble by using the random access channel resource includes:

sending, by the user equipment, the random access preamble on a sixth uplink bandwidth part by using the random access channel resource; where the random access preamble set is a random access preamble set configured on the sixth uplink bandwidth part;

the random access channel time domain resource in the random access channel resource set is a random access channel time domain resource configured on the sixth uplink bandwidth part; and the random access channel frequency domain resource in the random access channel resource set is a random access channel frequency domain resource configured on the sixth uplink bandwidth part.

Further, the sixth uplink bandwidth part is:

an initial uplink bandwidth part of the user equipment in a serving cell; or a first active uplink bandwidth part of the user equipment in the serving cell; or a default uplink bandwidth part of the user equipment in the serving cell; or an uplink bandwidth part configured or indicated by the network device for the user equipment by using dedicated signaling; where the serving cell is a serving cell in which the user equipment sends the random access preamble.

Further, the method includes:

if the random access process is a non-contention-based random access process, performing, by the user equipment, uplink transmission on the sixth uplink bandwidth part, where a physical resource used for the uplink transmission is a physical resource indicated by an uplink grant in the random access response.

In a possible design, the method further includes:

receiving, by the user equipment, a second message sent by the network device, where the second message includes configuration information indicating a correspondence between the first downlink bandwidth part and a seventh uplink bandwidth part.

Further, the random access channel frequency domain resource in the random access channel resource set is N physical resource blocks in a center of the seventh uplink bandwidth part, where N is a predefined positive integer;

the random access channel time domain resource in the random access channel resource set is the same as a random access channel time domain resource configured on an eighth uplink bandwidth part of the user equipment; and the random access preamble set is the same as a random access preamble set configured on the eighth uplink bandwidth part of the user equipment.

Further, the eighth uplink bandwidth part is:

an initial uplink bandwidth part of the user equipment in a serving cell; or a first active uplink bandwidth part of the user equipment in the serving cell; or a default uplink bandwidth part of the user equipment in the serving cell; or an uplink bandwidth part configured or indicated by the network device for the user equipment by using dedicated signaling; where the serving cell is a serving cell in which the user equipment sends the random access preamble.

Further, the sending, by the user equipment, the random access preamble by using the random access channel resource includes:

sending, by the user equipment, the random access preamble on the seventh uplink bandwidth part by using the random access channel resource.

Further, the method includes:

if an uplink bandwidth part that is active when the user equipment performs the random access process is a ninth uplink bandwidth part, the user equipment activates the seventh uplink bandwidth part and deactivates the ninth uplink bandwidth part, or the user equipment switches from the ninth uplink bandwidth part to the seventh uplink bandwidth part.

Correspondingly, the sending, by the user equipment, the random access preamble by using the random access channel resource includes:

sending, by the user equipment, the random access preamble on the seventh uplink bandwidth part by using the random access channel resource.

Further, the method includes:

if the random access process is a contention-based random access process, sending, by the user equipment, the random access process message 3 on the seventh uplink bandwidth part; and receiving, by the user equipment on the first downlink bandwidth part, a physical downlink control channel for scheduling retransmission of the random access process message 3 and transmission of a random access process message 4.

In a possible design, the method further includes:

receiving, by the user equipment, a third message sent by the network device, where the third message includes random access information and configuration information indicating a correspondence between the first downlink bandwidth part and the random access information, and the random access information includes at least one piece of the following information:

fourth configuration information of random access that is used to indicate a random access channel frequency domain resource;

fifth configuration information of random access that is used to indicate a random access channel time domain resource; and sixth configuration information of random access that is used to indicate a random access preamble set.

Further, the random access information includes only the fourth configuration information.

Correspondingly, the random access channel frequency domain resource in the random access channel resource set is the random access channel frequency domain resource indicated by the fourth configuration information;

the random access channel time domain resource in the random access channel resource set is the same as a random access channel time domain resource corresponding to a third downlink bandwidth part of the user equipment, and the random access preamble set is the same as a random access preamble set corresponding to the third downlink bandwidth part of the user equipment.

Further, the random access information includes only the fifth configuration information.

Correspondingly, the random access channel time domain resource in the random access channel resource set is the random access channel time domain resource indicated by the fifth configuration information;

the random access channel frequency domain resource in the random access channel resource set is the same as a random access channel frequency domain resource corresponding to a third downlink bandwidth part of the user equipment, and the random access preamble set is the same as a random access preamble set corresponding to the third downlink bandwidth part of the user equipment.

Further, the random access information includes only the sixth configuration information.

Correspondingly, the random access channel frequency domain resource in the random access channel resource set is a random access channel frequency domain resource corresponding to a third downlink bandwidth part of the user equipment;

the random access channel time domain resource in the random access channel resource set is the same as a random access channel time domain resource corresponding to the third downlink bandwidth part of the user equipment, and the random access preamble set is the random access preamble set indicated by the sixth configuration information.

Further, the random access information includes the fourth configuration information and the fifth configuration information.

Correspondingly, the random access channel frequency domain resource in the random access channel resource set is the random access channel frequency domain resource indicated by the fourth configuration information;

the random access channel time domain resource in the random access channel resource set is the random access channel time domain resource indicated by the fifth configuration information; and the random access preamble set is the same as a random access preamble set corresponding to the third downlink bandwidth part of the user equipment.

Further, the random access information includes the fourth configuration information and the sixth configuration information.

Correspondingly, the random access channel frequency domain resource in the random access channel resource set is the random access channel frequency domain resource indicated by the fourth configuration information;

the random access preamble set is the random access preamble set indicated by the sixth configuration information, and the random access channel time domain resource in the random access channel resource set is the same as a random access channel time domain resource corresponding to the third downlink bandwidth part of the user equipment.

Further, the random access information includes the fifth configuration information and the sixth configuration information.

Correspondingly, the random access channel time domain resource in the random access channel resource set is the random access channel time domain resource indicated by the fifth configuration information;

the random access preamble set is the random access preamble set indicated by the sixth configuration information, and the random access channel frequency domain resource in the random access channel resource set is the same as a random access channel frequency domain resource corresponding to the third downlink bandwidth part of the user equipment.

Further, the random access information includes the fourth configuration information, the fifth configuration information, and the sixth configuration information.

Correspondingly, the random access channel frequency domain resource in the random access channel resource set is the random access channel frequency domain resource indicated by the fourth configuration information;

the random access channel time domain resource in the random access channel resource set is the random access channel time domain resource indicated by the fifth configuration information; and the random access preamble set is the random access preamble set indicated by the sixth configuration information.

Further, the third downlink bandwidth part is:

an initial downlink bandwidth part of the user equipment in a serving cell; or a first active downlink bandwidth part of the user equipment in the serving cell; or a default downlink bandwidth part of the user equipment in the serving cell; or an uplink bandwidth part configured or indicated by the network device for the user equipment by using dedicated signaling; where the serving cell is a serving cell in which the user equipment sends the random access preamble.

Further, the method includes:

sending, by the user equipment, the random access preamble on a tenth uplink bandwidth part by using the random access channel resource; where the tenth uplink bandwidth part includes the random access channel frequency domain resource in the random access channel resource set.

Further, the method includes:

if an uplink bandwidth part that is active when the user equipment performs the random access process is an eleventh uplink bandwidth part, activating, by the user equipment, the tenth uplink bandwidth part and deactivating the eleventh uplink bandwidth part, or switching, by the user equipment, from the eleventh uplink bandwidth part to the tenth uplink bandwidth part.

Correspondingly, the sending, by the user equipment, the random access preamble by using the random access channel resource includes:

sending, by the user equipment, the random access preamble on the tenth uplink bandwidth part by using the random access channel resource.

Further, the method includes:

if the random access process is a contention-based random access process, sending, by the user equipment, the random access process message 3 on the tenth uplink bandwidth part; and receiving, by the user equipment on the first downlink bandwidth part, a physical downlink control channel for scheduling retransmission of the random access process message 3 and transmission of a random access process message 4.

In a possible design, the first downlink bandwidth part is a downlink bandwidth part corresponding to a twelfth uplink bandwidth part of the user equipment.

The twelfth uplink bandwidth part is an uplink bandwidth part that is active when the user equipment performs the random access.

Correspondingly, the sending, by the user equipment, the random access preamble by using the random access channel resource includes:

sending, by the user equipment, the random access preamble on the twelfth uplink bandwidth part by using the random access channel resource.

Further, the method includes:

receiving, by the user equipment, a fourth message sent by the network device, where the fourth message includes the twelfth uplink bandwidth part configured for the user equipment, random access information of the twelfth uplink bandwidth part, and configuration information indicating a correspondence between the twelfth bandwidth part and the first downlink bandwidth part, where the random access information of the twelfth uplink bandwidth part includes at least one piece of the following information:

seventh configuration information of random access that is used to indicate a random access channel frequency domain resource;

eighth configuration information of random access that is used to indicate a random access channel time domain resource; and ninth configuration information of random access that is used to indicate a random access preamble set.

Further, the random access information of the twelfth uplink bandwidth part includes only the seventh configuration information.

Correspondingly, the random access channel frequency domain resource in the foregoing random access channel resource set is a random access channel frequency domain resource indicated by the seventh configuration information of random access;

the random access channel time domain resource in the foregoing random access channel resource set is the same as a random access channel time domain resource of a thirteenth uplink bandwidth part of the user equipment; and the random access preamble set is the same as a random access preamble set of the thirteenth uplink bandwidth part of the user equipment.

Further, the random access information of the twelfth uplink bandwidth part includes only the eighth configuration information.

Correspondingly, the random access channel time domain resource in the foregoing random access channel resource set is a random access channel time domain resource indicated by the eighth configuration information of random access;

the random access channel frequency domain resource in the random access channel resource set is N physical resource blocks in a center of the twelfth uplink bandwidth part, where N is a predefined positive integer; and the random access preamble set is the same as a random access preamble set of a thirteenth uplink bandwidth part of the user equipment.

Further, the random access information of the twelfth uplink bandwidth part includes only the ninth configuration information.

Correspondingly, the random access preamble set is the random access preamble set indicated by the ninth configuration information of random access;

the random access channel frequency domain resource in the random access channel resource set is N physical resource blocks in a center of the twelfth uplink bandwidth part, where N is a predefined positive integer; and the random access channel time domain resource in the foregoing random access channel resource set is the same as a random access time domain resource of a thirteenth uplink bandwidth part of the user equipment.

Further, the random access information of the twelfth uplink bandwidth part includes the seventh configuration information and the eighth configuration information.

Correspondingly, the random access channel frequency domain resource in the foregoing random access channel resource set is a random access channel frequency domain resource indicated by the seventh configuration information of random access;

the random access channel time domain resource in the foregoing random access channel resource set is the same as a random access channel time domain resource indicated by the eighth configuration information of random access; and the random access preamble set is the same as a random access preamble set of a thirteenth uplink bandwidth part of the user equipment.

Further, the random access information of the twelfth uplink bandwidth part includes the seventh configuration information and the ninth configuration information.

Correspondingly, the random access channel frequency domain resource in the foregoing random access channel resource set is a random access channel frequency domain resource indicated by the seventh configuration information of random access;

the random access preamble set is the random access preamble set indicated by the ninth configuration information of random access; and the random access channel time domain resource in the random access channel resource set is the same as a random access channel time domain resource of a thirteenth uplink bandwidth part of the user equipment.

Further, the random access configuration information of the twelfth uplink bandwidth part includes the eighth configuration information and the ninth configuration information.

Correspondingly, the random access channel time domain resource in the foregoing random access channel resource set is a random access channel time domain resource indicated by the eighth configuration information of random access;

the random access preamble set is the random access preamble set indicated by the ninth configuration information of random access; and the random access channel frequency domain resource in the random access channel resource set is N physical resource blocks in a center of the twelfth uplink bandwidth part, where N is a predefined positive integer.

Further, the random access configuration information of the twelfth uplink bandwidth part includes the seventh configuration information, the eighth configuration information, and the ninth configuration information.

Correspondingly, the random access channel frequency domain resource in the foregoing random access channel resource set is a random access channel frequency domain resource indicated by the seventh configuration information of random access;

the random access channel time domain resource in the foregoing random access channel resource set is a random access channel time domain resource indicated by the eighth configuration information of random access; and the random access preamble set is the random access preamble set indicated by the ninth configuration information of random access.

Further, the thirteenth uplink bandwidth part is:

an initial uplink bandwidth part of the user equipment in the serving cell; or a first active uplink bandwidth part of the user equipment in the serving cell; or a default uplink bandwidth part of the user equipment in the serving cell; or an uplink bandwidth part configured or indicated by the network device for the user equipment by using dedicated signaling; where the serving cell is a serving cell in which the user equipment sends the random access preamble.

Further, the method includes:

if a downlink bandwidth part that is active when the user equipment performs the random access is a fourth downlink bandwidth part, activating, by the user equipment, the first downlink bandwidth part and deactivating the fourth downlink bandwidth part, or switching, by the user equipment, from the fourth downlink bandwidth part to the first downlink bandwidth part.

Further, the method includes:

if the random access process is a contention-based random access process, sending, by the user equipment, the random access process message 3 on the twelfth uplink bandwidth part; and receiving, by the user equipment on the first downlink bandwidth part, a physical downlink control channel for scheduling retransmission of the random access process message 3 and transmission of a random access process message 4.

Further, the method includes:

The serving cell is a primary serving cell of the terminal device or a secondary serving cell of the terminal device.

The primary serving cell includes a primary serving cell in a master cell group of the terminal device and a primary serving cell in a secondary cell group of the terminal device.

According to a second aspect, this application provides a random access method, and the method includes:

receiving, by a network device, a random access preamble sent by user equipment by using a random access channel resource, where the random access preamble is selected by the user equipment from a random access preamble set, and the random access channel resource is selected by the user equipment from a random access channel resource set; and sending, by the network device, a random access response to the user equipment on a first downlink bandwidth part; where at least one of the random access preamble set or the random access channel resource set corresponds to the first downlink bandwidth part; and the random access channel resource includes at least one of a random access channel time domain resource or a random access channel frequency domain resource.

Further, the first downlink bandwidth part is a downlink bandwidth part that is active when the user equipment performs the random access process.

Further, that at least one of the random access preamble set or the random access channel resource set corresponds to the first downlink bandwidth part includes:

at least one of the random access preamble set and the random access channel resource set corresponds to a first control resource set of the first downlink bandwidth part, and the first control resource set indicates a time-frequency domain resource set used by the user equipment to receive or search for a downlink control channel; where the downlink control channel is used to schedule any downlink transmission and/or uplink transmission; or the downlink control channel is used to schedule at least one of transmission of a random access process message 2, retransmission of a random access process message 3, and transmission of a random access process message 4, where the random access process message 2 is a random access response message, the random access process message 3 is uplink transmission scheduled for the first time, and the random access process message 4 is a random access contention resolution message.

In a possible design, the method further includes:

sending, by the network device, a first message to the user equipment, where the first message includes configuration information indicating a correspondence between the first downlink bandwidth part and a first uplink bandwidth part and includes random access information of the first uplink bandwidth part, or the first message includes configuration information indicating a correspondence between the first downlink bandwidth part and random access information and includes a first uplink bandwidth part corresponding to the random access information; where the random access information includes at least one piece of the following information:

first configuration information of random access that is used to indicate a random access channel frequency domain resource;

second configuration information of random access that is used to indicate a random access channel time domain resource; and third configuration information of random access that is used to indicate a random access preamble set.

Further, the random access information includes only the first configuration information.

Correspondingly, the random access channel frequency domain resource in the random access channel resource set is the random access channel frequency domain resource indicated by the first configuration information;

the random access channel time domain resource in the random access channel resource set is the same as a random access channel time domain resource configured on a second uplink bandwidth part of the user equipment; and the random access preamble set is the same as a random access preamble set configured on the second uplink bandwidth part of the user equipment.

Further, the random access information includes only the second configuration information.

Correspondingly, the random access channel time domain resource in the random access channel resource set is the random access channel time domain resource indicated by the second configuration information;

the random access channel frequency domain resource in the random access channel resource set is N physical resource blocks in a center of the first uplink bandwidth part, where N is a predefined positive integer; and the random access preamble set is the same as a random access preamble set configured on a second uplink bandwidth part of the user equipment.

Further, the random access information of the first uplink bandwidth part includes only the third configuration information.

Correspondingly, the random access preamble set is the random access preamble set indicated by the third configuration information;

the random access channel frequency domain resource in the random access channel resource set is N physical resource blocks in a center of the first uplink bandwidth part, where N is a predefined positive integer; and the random access channel time domain resource in the random access channel resource set is the same as a random access channel time domain resource configured on a second uplink bandwidth part of the user equipment.

Further, the random access information of the first uplink bandwidth part includes the first configuration information and the second configuration information.

Correspondingly, the random access channel frequency domain resource in the random access channel resource set is the random access channel frequency domain resource indicated by the first configuration information;

the random access channel time domain resource in the random access channel resource set is the random access channel time domain resource indicated by the second configuration information; and the random access preamble set is the same as a random access preamble set configured on a second uplink bandwidth part of the user equipment.

Further, the random access information of the first uplink bandwidth part includes the first configuration information and the third configuration information that are of random access.

Correspondingly, the random access channel frequency domain resource in the random access channel resource set is the random access channel frequency domain resource indicated by the first configuration information;

the random access preamble set is the random access preamble set indicated by the third configuration information of random access; and the random access channel time domain resource in the random access channel resource set is the same as a random access channel time domain resource configured on a second uplink bandwidth part of the user equipment.

Further, the random access information of the first uplink bandwidth part includes the second configuration information and the third configuration information.

Correspondingly, the random access channel time domain resource in the random access channel resource set is the random access channel time domain resource indicated by the second configuration information;

the random access preamble set is the random access preamble set indicated by the third configuration information; and the random access channel frequency domain resource in the random access channel resource set is N physical resource blocks in a center of the first uplink bandwidth part, where N is a predefined positive integer.

Further, the random access information of the first uplink bandwidth part includes the first configuration information, the second configuration information, and the third configuration information.

Correspondingly, the random access channel frequency domain resource in the random access channel resource set is the random access channel frequency domain resource indicated by the first configuration information;

the random access channel time domain resource in the random access channel resource set is the random access channel time domain resource indicated by the second configuration information;

the random access preamble set is the random access preamble set indicated by the third configuration information.

Further, the second uplink bandwidth part is:

an initial uplink bandwidth part of the user equipment in a serving cell; or a first active uplink bandwidth part of the user equipment in the serving cell; or a default uplink bandwidth part of the user equipment in the serving cell; or an uplink bandwidth part configured or indicated by the network device for the user equipment by using dedicated signaling; where the serving cell is a serving cell in which the user equipment sends the random access preamble.

Further, the method includes:

receiving, by the network device, the random access preamble sent by the user equipment on the first uplink bandwidth part by using the random access channel resource.

In a possible design, the first downlink bandwidth part is a downlink bandwidth part corresponding to a fourth uplink bandwidth part of the user equipment, where the fourth uplink bandwidth part is an uplink bandwidth part that is of the user equipment in a serving cell and on which a random access preamble set and a random access channel resource set are configured;

the random access preamble set is the random access preamble set configured on the fourth uplink bandwidth part;

the random access channel time domain resource in the random access channel resource set is a random access channel time domain resource configured on the fourth uplink bandwidth part;

the random access channel frequency domain resource in the random access channel resource set is a random access channel frequency domain resource configured on the fourth uplink bandwidth part; and correspondingly, the receiving, by a network device, a random access preamble sent by user equipment by using a random access channel resource includes:

receiving, by the network device, the random access preamble sent by the user equipment on the fourth uplink bandwidth part by using the random access channel resource.

In a possible design, the receiving, by a network device, a random access preamble sent by user equipment by using a random access channel resource includes:

receiving, by the network device, the random access preamble sent by the user equipment on a sixth uplink bandwidth part by using the random access channel resource; where the random access preamble set is a random access preamble set configured on the sixth uplink bandwidth part;

the random access channel time domain resource in the random access channel resource set is a random access channel time domain resource configured on the sixth uplink bandwidth part; and the random access channel frequency domain resource in the random access channel resource set is a random access channel frequency domain resource configured on the sixth uplink bandwidth part.

According to a third aspect, this application provides user equipment, and the user equipment has functions of implementing the user equipment in the first aspect. These functions may be implemented by hardware, or may be implemented by hardware executing corresponding software. The hardware or software includes one or more modules corresponding to the foregoing functions.

In a possible design, the user equipment may include a receiving module, a processing module, and a sending module. These modules may execute corresponding functions in the foregoing method. For example, the processing module is configured to: select a random access preamble from a random access preamble set, and select a random access channel resource from a random access channel resource set; the sending module is configured to send the random access preamble by using the random access channel resource; and the receiving module is configured to receive a random access response message on a first downlink bandwidth part.

According to a fourth aspect, this application provides a network device, and the network device has functions of implementing the network device in the second aspect. These functions may be implemented by hardware, or may be implemented by hardware executing corresponding software. The hardware or software includes one or more modules corresponding to the foregoing functions.

In a possible design, the network device may include a receiving module, a processing module, and a sending module. These modules may execute corresponding functions in the foregoing method. For example, the receiving module is configured to receive a random access preamble sent by user equipment by using a random access channel resource, where the random access preamble is selected by the user equipment from a random access preamble set, and the random access channel resource is selected by the user equipment from a random access channel resource set; and the processing module sends a random access response to the user equipment on a first downlink bandwidth part by using the sending module.

According to a fifth aspect, this application provides user equipment, and the user equipment includes a processor and a memory. The memory is configured to store an instruction, and the processor is configured to execute the instruction in the memory to execute the method in the first aspect.

According to a sixth aspect, this application provides a network device, and the network device includes a processor and a memory. The memory is configured to store an instruction, and the processor is configured to execute the instruction in the memory to execute the method in the second aspect.

According to a seventh aspect, this application provides a chip, and the chip may be used for user equipment. The chip includes at least one communications interface, at least one processor, and at least one memory, where the communications interface, the processor, and the memory are interconnected by using a circuit (or a bus in some cases), and the processor invokes an instruction stored in the memory to execute the method in the foregoing first aspect.

According to an eighth aspect, this application provides a chip, and the chip may be used for a network device. The chip includes at least one communications interface, at least one processor, and at least one memory, where the communications interface, the processor, and the memory are interconnected by using a circuit (or a bus in some cases), and the processor invokes an instruction stored in the memory to execute the method in the foregoing second aspect.

According to a ninth aspect, this application provides a computer readable medium. The computer readable medium stores one or more program codes, and when user equipment executes the program code, the user equipment performs related method steps performed by the user equipment in the first aspect.

According to a tenth aspect, this application provides a computer readable medium. The computer readable medium stores one or more program codes, and when a network device executes the program code, the network device performs related method steps performed by the network device in the second aspect.

DESCRIPTION OF EMBODIMENTS

Figure 1:
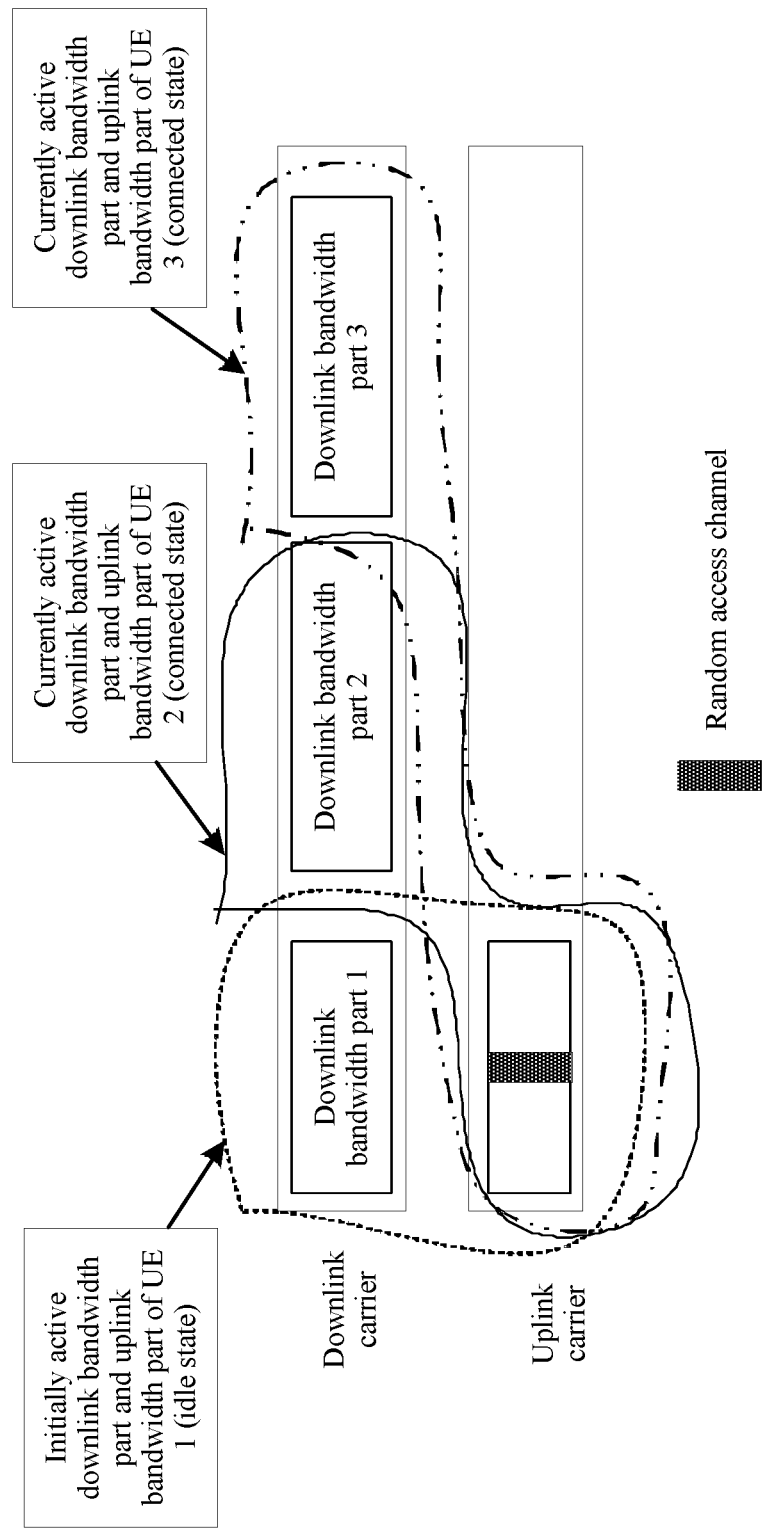
FIG. 1 and FIG. 2 are schematic diagrams of scenarios involved in this application.
Figure 2:
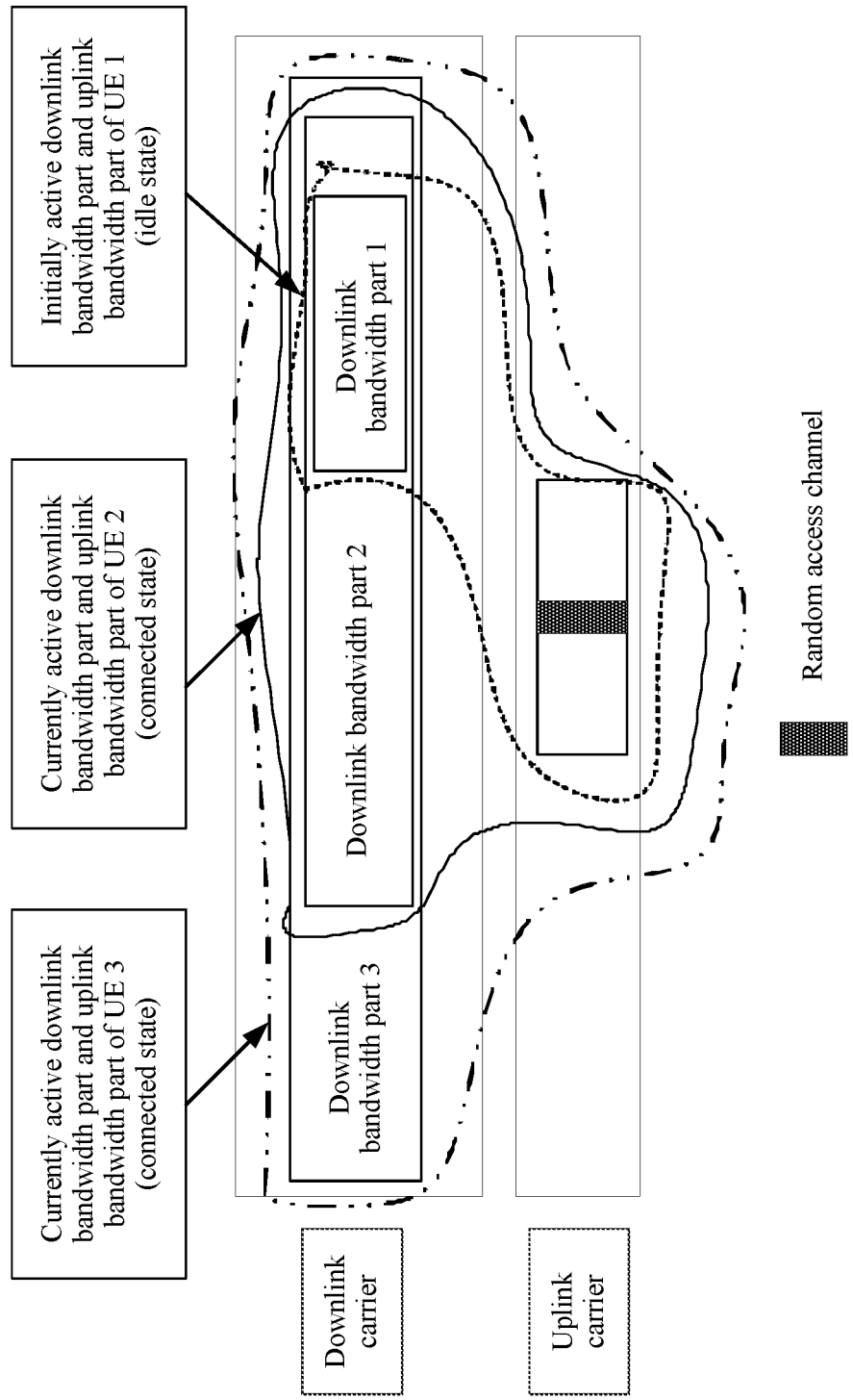

FIG. 1 and FIG. 2 are schematic diagrams of scenarios involved in this application. As shown in FIG. 1 and FIG. 2, it is assumed that UE 1 is in an idle state, and UE 2 and UE 3 are in a connected state. Active downlink bandwidth parts of the UE 1, the UE 2, and the UE 3 are respectively a downlink bandwidth part 1, a downlink bandwidth part 2, and a downlink bandwidth part 3. Random access channels PRACHs currently configured for the UE 1, the UE 2, and the UE 3 are the same, and optional random access preamble sets used for contention-based random access are the same.

For the contention-based random access, after a network device receives a random access preamble and before the network device successfully receives an Msg3, the network device does not know which UE sends the random access preamble, and therefore, the network device does not know which downlink bandwidth part (BWP) is a currently active downlink BWP of the UE. To enable the UE to receive an RAR and a possible PDCCH for scheduling retransmission of the Msg3, the network device needs to send, on all configured DL bandwidth parts, the RAR and the PDCCH for scheduling retransmission of the Msg3.

Because the network device sends, on all configured DL bandwidth parts, the RAR and the PDCCH for scheduling retransmission of the Msg3, a great waste of downlink resources is caused.

The technical solutions provided in this application are intended to resolve the foregoing problem.

To facilitate a person skilled in the art to understand this application, the following first describes concepts involved in this application.

1. Bandwidth Part

Figure 3:
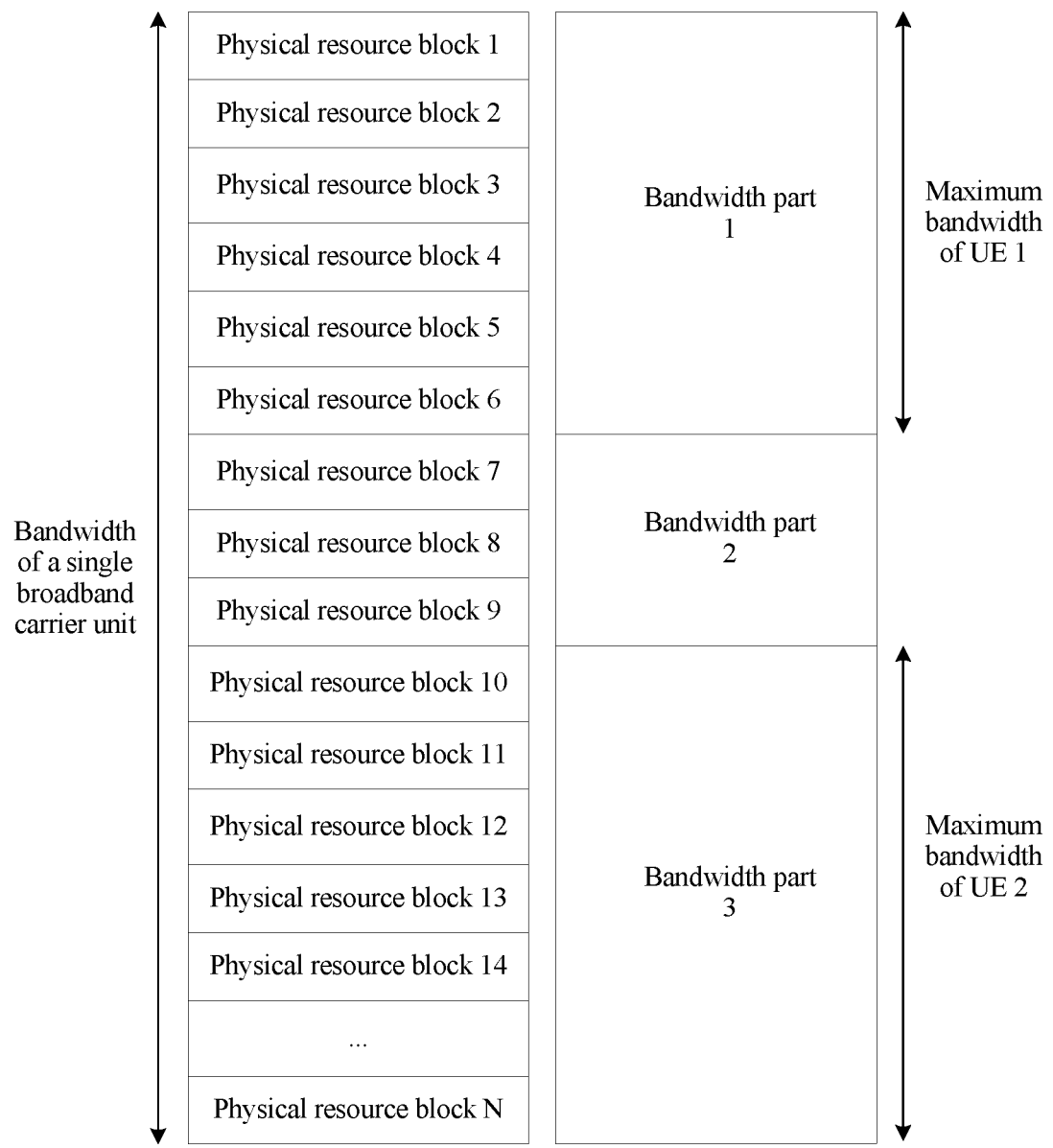
FIG. 3 is a schematic diagram of bandwidth parts.

When bandwidth of a cell is large, the user equipment may work on only a part of the bandwidth of the cell. Each part of the bandwidth of the cell is referred to as a bandwidth part. FIG. 3 is a schematic diagram of bandwidth parts. On a broadband carrier, a network device may configure one or more downlink bandwidth parts and one or more uplink bandwidth parts for one user equipment. Each downlink bandwidth part and each uplink bandwidth part configured for the user equipment each have an ID of the bandwidth part. Configuration information corresponding to each BWP includes at least:

(1) Physical layer numerology supported by the BWP, including a subcarrier spacing configuration and a cyclic prefix length, where numerology supported by different BWPs may be the same or different;

(2) Bandwidth of the BWP;

(3) A frequency location of the BWP.

2. Random Access

A random access process includes two types: contention-based random access and non-contention-based random access.

Figure 4:
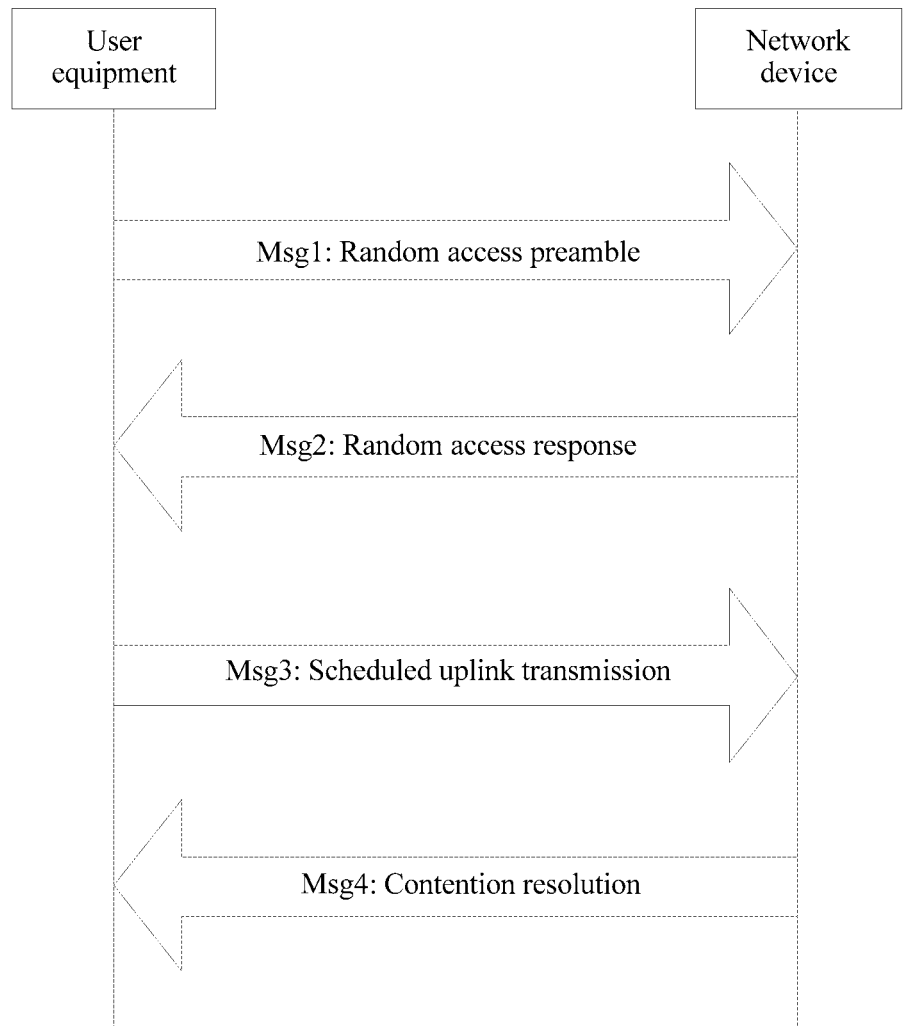
FIG. 4 is a schematic diagram of a contention-based random access process.

FIG. 4 is a schematic diagram of a contention-based random access process. As shown in FIG. 4, the contention-based random access process specifically includes the following steps:

Msg1: UE sends a random access preamble on a physical random access channel (Physical Random Access Channel, PRACH) of a serving cell.

A PRACH resource set is configured by a network device by using system information. The UE randomly selects a PRACH resource from the PRACH resource set to send the random access preamble. The PRACH resource includes a PRACH time domain resource and a PRACH frequency domain resource.

A set of random access preambles available to the contention-based random access is configured by the network device for the UE by using the system information. The UE randomly selects a random access preamble from the available random access preambles for sending.

Msg2: The network device schedules an RAR to the UE by using a PDCCH scrambled by using an RA-RNTI. The UE receives, in the serving cell in which the random access preamble is sent, an RAR message scheduled by the network device.

The network device cannot identify, based on only the received random access preamble, UE that sends the random access preamble.

Msg3: After successfully receiving a random access response message of the UE, the UE sends an Msg3 by using a resource location indicated by an uplink grant in the RAR.

Msg4: If the network device can successfully decode the Msg3 sent by the UE, the network device returns a contention resolution message. After receiving the contention resolution message, the UE considers that the current random access process succeeds. Otherwise, if the UE does not receive the contention resolution message when a timer used for contention resolution expires, the UE considers that the current random access fails and needs to resend random access.

If the network device fails to decode the Msg3, the network device schedules the UE to retransmit the Msg3.

Only after the network device successfully receives the Msg3, can the network device determine, based on ID information of the UE included in the Msg3, which UE is performing random access.

Figure 5:
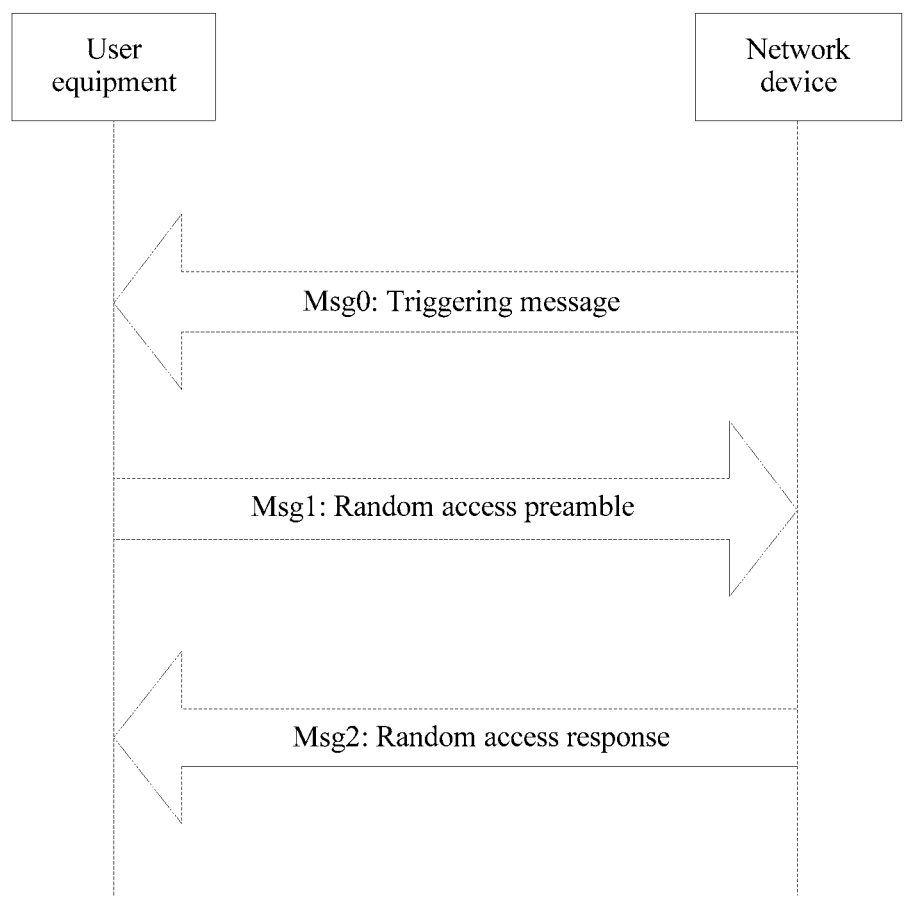
FIG. 5 is a schematic diagram of a non-contention-based random access process.

FIG. 5 is a schematic diagram of a non-contention-based random access process. As shown in FIG. 5, the non-contention-based random access process specifically includes the following steps:

Msg0: A network device sends a message to trigger UE to initiate random access. For different random access triggering reasons or events, the message has two types:

The network device triggers, by using a PDCCH indication, the UE to initiate random access when the UE has downlink data arriving but the UE is not in uplink synchronization, or to establish uplink synchronization of the UE in an SCell. The PDCCH indication includes a random access preamble to be sent by the UE and configuration information of a PRACH (Physical Random Access Channel) for sending the random access preamble.

When the UE needs to be handed over, the network device sends a radio resource control (RRC) connection reconfiguration message that carries mobility control information to the UE. The UE initiates a random access process after receiving the message. In this case, the mobility control information includes a random access preamble to be sent by the UE and configuration information of a PRACH for sending the random access preamble.

Msg1: The UE sends, on the PRACH indicated in the Msg0, the random access preamble allocated in the Msg0.

Msg2: The network device schedules an RAR to the UE by using a PDCCH scrambled by using an RA-RNTI.

After successfully receiving the random access response message sent to the UE, the UE obtains uplink synchronization, and then transmits uplink data to the network device by using an uplink grant in the RAR.

In this application, a correspondence between a downlink bandwidth part and a random access-related configuration is established, or a correspondence between an uplink bandwidth part and a random access configuration is established, or a correspondence between a downlink bandwidth part and an uplink bandwidth part is established, so that the network device sends an RAR and a PDCCH for scheduling Msg3 retransmission on only the downlink bandwidth part corresponding to the random access configuration based on the foregoing correspondence.

The following embodiments of this application are used to describe optional implementations of the foregoing correspondences.

It should be noted that "corresponding" described in the following embodiments of this application is used to indicate a mapping relationship. Therefore, in the following embodiments of this application, "corresponding" may be replaced with a word indicating a mapping relationship, such as "associated", "mapping", "include", or the like. Correspondingly, "correspondence" may be replaced with a word indicating a mapping relationship, such as "association relationship", "mapping relationship", and "inclusion relationship".

The following describes optional implementations for describing the foregoing correspondences.

Figure 6:
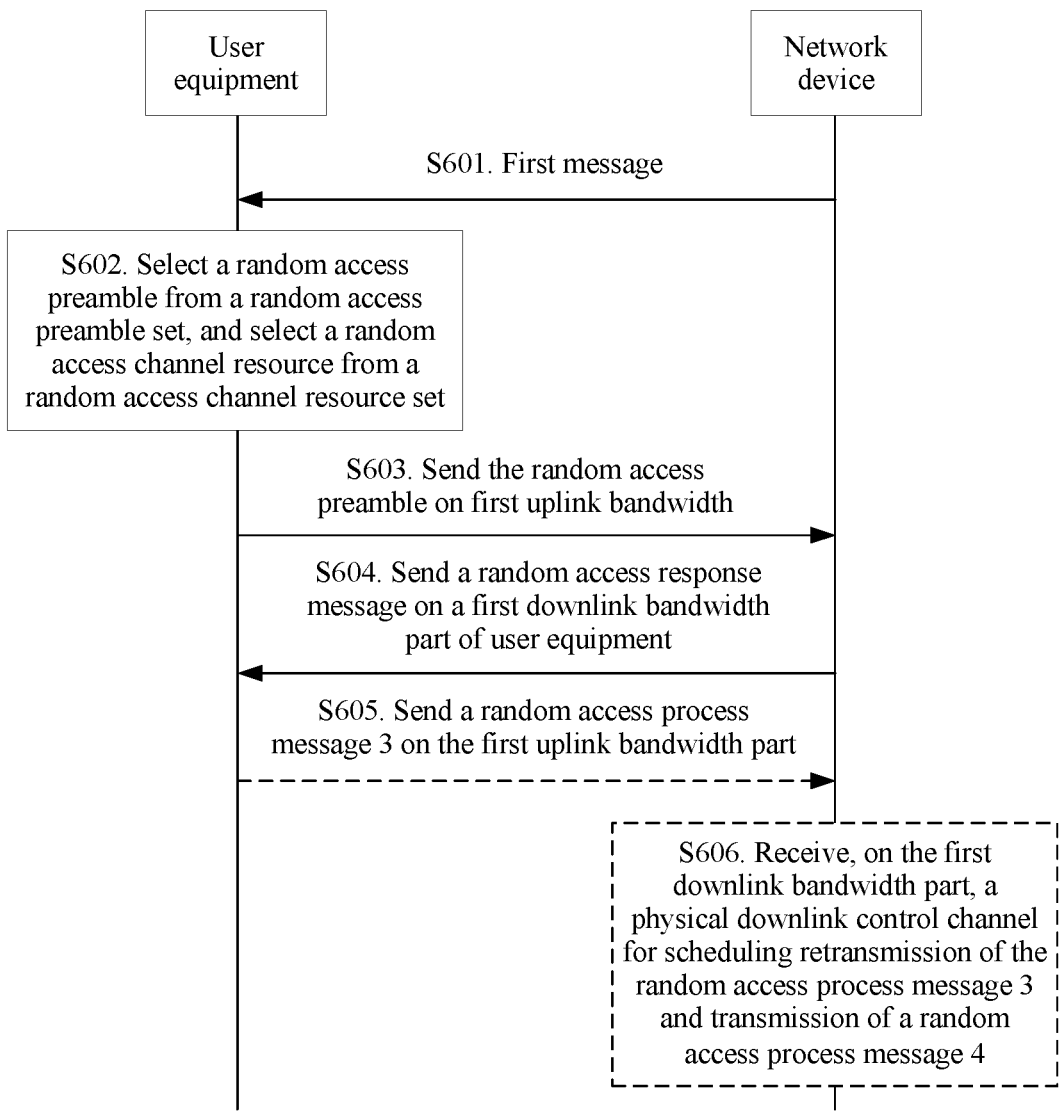
FIG. 6 is an interaction flowchart of Embodiment 1 of a random access processing method according to this application.

FIG. 6 is an interaction flowchart of Embodiment 1 of a random access processing method according to this application. As shown in FIG. 6, the random access process includes the following steps.

S601. A network device sends a first message to UE.

The first message includes configuration information indicating a correspondence between the first downlink bandwidth part and a first uplink bandwidth part and includes random access information of the first uplink bandwidth part.

Specific implementations of the configuration information in the first message include the following implementations.

Implementation 1-1: A configuration information element of a downlink bandwidth part includes an identifier BWP ID and random access information that are of an uplink bandwidth part corresponding to the downlink bandwidth part. Optionally, the uplink bandwidth part is an uplink bandwidth part that is configured by the network device for the UE before the network device sends the first message.

Implementation 1-2: A configuration information element of a downlink bandwidth part includes a configuration information element of an uplink bandwidth part corresponding to the downlink bandwidth part. The configuration information element of the uplink bandwidth part includes a BWP identifier of the uplink bandwidth part and random access information corresponding to the uplink bandwidth part. Optionally, the uplink bandwidth part is an uplink bandwidth part that is configured by the network device for the UE before the network device sends the first message.

Implementation 1-3: A configuration information element of a downlink bandwidth part includes configuration information and random access information that are of an uplink bandwidth part corresponding to the downlink bandwidth part. Optionally, the uplink bandwidth part is an uplink bandwidth part that is configured by the network device for the UE in the first message.

Implementation 1-4: A configuration information element of a downlink bandwidth part includes a configuration information element of an uplink bandwidth part corresponding to the downlink bandwidth part. The configuration information element of the uplink bandwidth part includes configuration information of the uplink bandwidth part and random access information corresponding to the uplink bandwidth part. Optionally, the uplink bandwidth part is an uplink bandwidth part that is configured by the network device for the UE in the first message.

Implementation 1-5: In the first message, configuration information of a downlink bandwidth part and configuration information of an uplink bandwidth part corresponding to the downlink bandwidth part are included in a same BWP configuration information element. Random access information of the uplink bandwidth part is included in a random access configuration information element, and the random access configuration information element includes a BWP ID of the uplink bandwidth part.

Alternatively, the first message includes configuration information indicating a correspondence between the first downlink bandwidth part and random access information and includes a first uplink bandwidth part corresponding to the random access information. The first message may be specifically a radio resource reconfiguration message.

Specific implementations of the configuration information in the first message include the following implementations.

Implementation 2-1: the same as implementation 1-1.

Implementation 2-2: A configuration information element of a downlink bandwidth part includes a configuration information element of random access information corresponding to the downlink bandwidth part. The configuration information element of the random access configuration information includes a BWP identifier of an uplink bandwidth part. Optionally, the uplink bandwidth part is an uplink bandwidth part that is configured by the network device for the UE before the network device sends the first message.

Implementation 2-3: the same as implementation 1-3.

Implementation 2-4: A configuration information element of a downlink bandwidth part includes a configuration information element of random access information corresponding to the downlink bandwidth part. The configuration information element of the random access information includes configuration information of an uplink bandwidth part. Optionally, the uplink bandwidth part is an uplink bandwidth part that is configured by the network device for the UE in the first message.

Implementation 2-5; the same as implementation 1-5.

The configuration information of the uplink bandwidth part includes at least one piece of the following information:

(1) A frequency domain location of the uplink bandwidth part;

(2) Bandwidth of the uplink bandwidth part; and (3) A bandwidth part identifier BWP ID of the uplink bandwidth part.

The configuration information of the downlink bandwidth part includes at least one piece of the following information:

(1) A frequency domain location of the downlink bandwidth part;

(2) Bandwidth of the downlink bandwidth part; and (3) A bandwidth part identifier BWP ID of the downlink bandwidth part.

The foregoing random access information includes at least one piece of the following information:

(1) First configuration information of random access that is used to indicate a random access channel frequency domain resource. Specifically, a location of the random access channel frequency domain resource, that is, a quantity and locations of physical resource blocks occupied by a random access channel in frequency domain, may be determined based on the first configuration information.

(2) Second configuration information of random access that is used to indicate a random access channel time domain resource. Specifically, a location of the random access channel time domain resource, that is, a frame number and an occupied symbol, a mini-slot, a slot, or numbers and a quantity of subframes of a random access channel in time domain may be determined based on the second configuration information.

(3) Third configuration information of random access that is used to indicate a random access preamble set. Specifically, an identifier ID of an available random access preamble may be determined based on the third configuration information.

The first configuration information, the second configuration information, and the third configuration information may be respectively configuration information of a specific random access channel frequency domain resource, configuration information of a specific random access channel time domain resource, and configuration information of a specific random access channel preamble, or may be a random access configuration identifier ID. The random access channel frequency domain resource, the random access channel time domain resource, and the random access channel preamble that correspond to the random access configuration identifier ID are preconfigured or predefined by the network device. Therefore, the UE may determine, based on the ID, the random access channel frequency domain resource, the random access channel time domain resource, and the random access channel preamble.

S602. The user equipment selects a random access preamble from a random access preamble set, and selects a random access channel resource from a random access channel resource set.

Specifically, at least one of the random access preamble set or the random access channel resource set corresponds to the first downlink bandwidth part. In other words, there is a correspondence between the first downlink bandwidth part and at least one of the random access preamble set or the random access channel resource set. The correspondence herein may be specifically understood as follows: When the UE performs random access, if the UE needs to or can only receive an RAR on the first downlink BWP, the UE can only select a random access preamble from the foregoing random access preamble set for sending, or can only select a random access channel resource from the foregoing random access channel resource set, or can only select a random access preamble from the foregoing random access preamble set for sending and can only select a random access channel resource from the foregoing random access channel resource set.

The random access channel resource set includes at least one of a random access channel time domain resource or a random access channel frequency domain resource.

The first downlink bandwidth part is a downlink bandwidth part that is active when the user equipment performs the random access process. The foregoing "when the user equipment performs the random access process" may be explained as follows:

Explanation 1: when the UE initiates the random access process, including: (1) when a media access control (MAC) entity of the UE triggers the random access process; (2) when RRC of the UE triggers the random access process; (3) when the UE receives a PDCCH indication sent by the network device and triggers the random access process; (4) when the UE receives RRC signaling sent by the network device and triggers the random access process.

Explanation 2: when the UE starts to perform the random access process.

Explanation 3: when the UE starts to open a window for listening to a random access response message.

The following separately describes methods for determining the foregoing random access channel resource set and the random access preamble set when the random access information of the first uplink bandwidth part is different.

1. The random access configuration information of the first uplink bandwidth part includes only the foregoing first configuration information.

In this case, the random access channel frequency domain resource in the foregoing random access channel resource set is the random access channel frequency domain resource indicated by the first configuration information;

the random access channel time domain resource in the foregoing random access channel resource set is the same as a random access channel time domain resource configured on a second uplink bandwidth part of the user equipment; and the foregoing random access preamble set is the same as a random access preamble set configured on the second uplink bandwidth part of the user equipment.

2. The random access configuration information of the first uplink bandwidth part includes only the foregoing second configuration information.

In this case, the random access channel time domain resource in the foregoing random access channel resource set is the random access channel time domain resource indicated by the second configuration information;

the random access channel frequency domain resource in the foregoing random access channel resource set is N physical resource blocks in a center of the first uplink bandwidth part, where N is a predefined positive integer; and the foregoing random access preamble set is the same as a random access preamble set configured on a second uplink bandwidth part of the user equipment.

3. The random access configuration information of the first uplink bandwidth part includes only the foregoing third configuration information.

In this case, the random access preamble set is the random access preamble set indicated by the third configuration information;

the random access channel frequency domain resource in the foregoing random access channel resource set is N physical resource blocks in a center of the first uplink bandwidth part, where N is a predefined positive integer; and the random access channel time domain resource in the foregoing random access channel resource set is the same as a random access channel time domain resource configured on a second uplink bandwidth part of the user equipment.

4. The random access configuration information of the first uplink bandwidth part includes the first configuration information and the second configuration information.

In this case, the random access channel frequency domain resource in the foregoing random access channel resource set is the random access channel frequency domain resource indicated by the first configuration information;

the random access channel time domain resource in the foregoing random access channel resource set is the random access channel time domain resource indicated by the second configuration information; and the foregoing random access preamble set is a random access preamble set of a second uplink bandwidth part of the user equipment.

5. The random access configuration information of the first uplink bandwidth part includes the first configuration information and the third configuration information.

In this case, the random access channel frequency domain resource in the foregoing random access channel resource set is the random access channel frequency domain resource indicated by the first configuration information;

the foregoing random access preamble set is the random access preamble set indicated by the third configuration information of random access; and the random access channel time domain resource in the foregoing random access channel resource set is the same as a random access channel time domain resource configured on a second uplink bandwidth part of the user equipment.

6. The random access configuration information of the first uplink bandwidth part includes the second configuration information and the third configuration information.

In this case, the random access channel time domain resource in the foregoing random access channel resource set is the random access channel time domain resource indicated by the second configuration information;

the foregoing random access preamble set is the random access preamble set indicated by the third configuration information; and the random access channel frequency domain resource in the foregoing random access channel resource set is N physical resource blocks in a center of the first uplink bandwidth part, where N is a predefined positive integer.

7. The random access configuration information of the first uplink bandwidth part includes the first configuration information, the second configuration information, and the third configuration information.

In this case, the random access channel frequency domain resource in the foregoing random access channel resource set is the random access channel frequency domain resource indicated by the first configuration information;

the random access channel time domain resource in the foregoing random access channel resource set is the random access channel time domain resource indicated by the second configuration information; and the foregoing random access preamble set is the random access preamble set indicated by the third configuration information.

Optionally, the "second uplink bandwidth part" involved in the foregoing cases may be specifically the following uplink bandwidth part:

an initial uplink bandwidth part (Initial UL BWP) of the user equipment in a serving cell, where the initial UL BWP may be (1) an initial UL BWP of the UE in an idle state, or may be (2) an initial UL BWP configured by the network device for the UE in a connected state; for (1), the initial UL BWP is an uplink bandwidth part configured in system information indicated by or associated with a cell defining synchronization signal block (Cell defining SS Block) in the serving cell of the UE; for (2), the initial UL BWP is an uplink bandwidth part configured by the network device in a public configuration information element of the serving cell of the UE; and the foregoing initial uplink bandwidth part may also be referred to as a cell defining uplink bandwidth part; or a first active uplink bandwidth part (First Active UL BWP) of the user equipment in the serving cell, where when the serving cell of the UE corresponding to the first active UL BWP is activated, the first uplink bandwidth part that is of the serving cell and that is synchronously activated is configured by the network device in a dedicated configuration information element of the serving cell; or a default uplink bandwidth part (Default UL BWP) of the user equipment in the serving cell, where the default UL BWP is an active uplink bandwidth part to which the UE backs off after no uplink data is transmitted in a period of time, and is configured by the network device in a cell-dedicated configuration information element of the serving cell; or one of uplink bandwidth parts that can be used to send the random access preamble and that is configured or indicated by the network device in a dedicated configuration information element of the serving cell for the user equipment.

The serving cell is a serving cell in which the UE sends the random access preamble.

Further, when one of the foregoing cases occurs, the user equipment determines the random access channel resource set and the random access preamble set in a manner of the case based on the specific configuration information in the first message, and selects the random access preamble and the random access channel resource from the random access channel resource set and the random access preamble set respectively.

S603. The user equipment sends the random access preamble on the first uplink bandwidth.

If an uplink bandwidth part that is active when the user equipment performs the random access process is a third uplink bandwidth part, that is, the active uplink bandwidth part is not the uplink bandwidth part corresponding to the first downlink bandwidth part, the user equipment activates the first uplink bandwidth part and deactivates the third uplink bandwidth part, or the user equipment switches from the third uplink bandwidth part to the first uplink bandwidth part.

Correspondingly, the sending, by the user equipment, the random access preamble by using the random access channel resource includes:

sending, by the user equipment, the random access preamble on the first uplink bandwidth part by using the random access channel resource.

S604. The network device sends a random access response message on the first downlink bandwidth part of the user equipment.

The following steps S605 and S606 are optional steps, and are performed when the random access is contention-based random access.

S605. The user equipment sends a random access process message 3 on the first uplink bandwidth part.

S606. The network device receives, on the first downlink bandwidth part, a physical downlink control channel for scheduling retransmission of the random access process message 3 and transmission of a random access process message 4.

In an optional implementation, if the user equipment receives, on the first downlink bandwidth part in the random access process, control signaling that instructs the UE to perform downlink BWP switching, that is, deactivate the first downlink bandwidth part and activate a new downlink bandwidth part, the UE needs to determine an uplink bandwidth part corresponding to the new downlink bandwidth part. If the uplink bandwidth part corresponding to the new DL is the same as the uplink bandwidth part corresponding to the first downlink bandwidth part, or random access information of the uplink bandwidth part corresponding to the new DL is the same as the random access information corresponding to the first downlink bandwidth part, the UE continues the current random access process; otherwise, the UE re-initiates a random access process and keeps a value of a variable and a value of a timer unchanged in the random access process.

In this embodiment, the network device sends the first message to the user equipment in advance, to configure the random access information corresponding to the first downlink bandwidth part; and the user equipment determines the random access preamble and the random access channel based on the random access information, and receives the RAR on the first downlink bandwidth part. In other words, the user equipment and the network device send messages on a corresponding random access channel based on the predetermined configuration, so that the network device is prevented from sending the RAR or the like on all coordinated downlink bandwidth parts, thereby greatly saving downlink resources.

Figure 7:
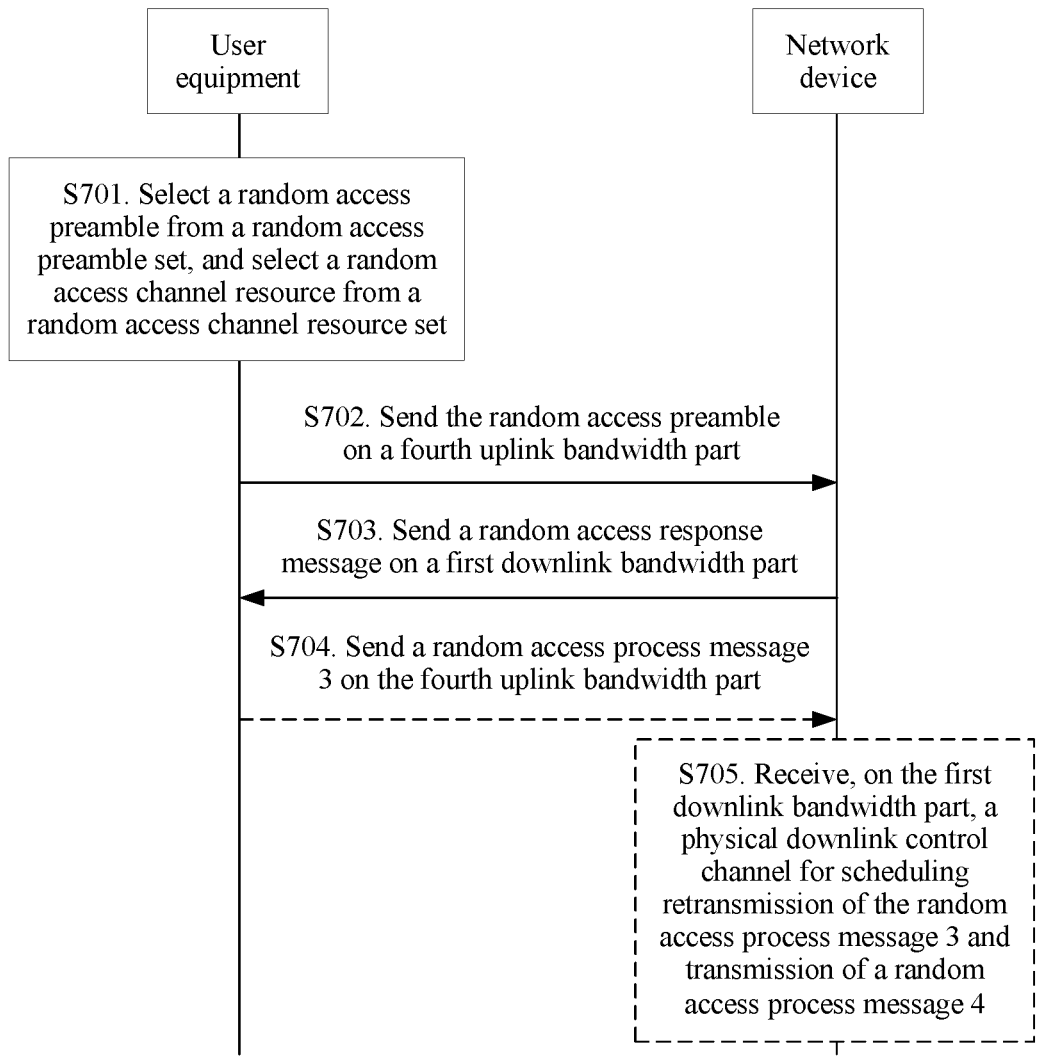
FIG. 7 is an interaction flowchart of Embodiment 2 of a random access processing method according to this application.

FIG. 7 is an interaction flowchart of Embodiment 2 of a random access processing method according to this application. As shown in FIG. 7, the random access process includes the following steps.

S701. User equipment selects a random access preamble from a random access preamble set, and selects a random access channel resource from a random access channel resource set.

Specifically, the random access preamble set and the random access channel resource set correspond to a first downlink bandwidth part. In other words, the random access preamble set and the random access channel resource set are in a correspondence with the first downlink bandwidth part. The correspondence herein may be specifically understood as follows: When the UE performs random access, the UE needs to select a random access channel resource from a random access channel resource set of an uplink bandwidth part configured for the UE, and select a random access preamble from a random access preamble set of the uplink bandwidth part, and the UE needs to receive an RAR message on the first downlink bandwidth part. Therefore, the random access channel resource set and the random access preamble set that are of the uplink bandwidth part are in a correspondence with the first downlink bandwidth part.

The random access preamble set is a random access preamble set of a fourth uplink bandwidth part.

A random access channel time domain resource in the random access channel resource set is a random access channel time domain resource of the fourth uplink bandwidth part.

A random access channel frequency domain resource in the random access channel resource set is a random access channel frequency domain resource of the fourth uplink bandwidth part.

The fourth uplink bandwidth part is an uplink bandwidth part on which the user equipment configures a random access channel in a serving cell. Specifically, the fourth uplink bandwidth part may be the following uplink bandwidth part:

an initial uplink bandwidth part (Initial UL BWP) of the user equipment in the serving cell, where the initial UL BWP may be (1) an initial UL BWP of the UE in an idle state, or may be (2) an initial UL BWP configured by the network device for the UE in a connected state; for (1), the initial UL BWP is an UL BWP configured in system information indicated by or associated with a cell defining synchronization signal block (Cell defining SS Block) in the serving cell of the UE; for (2), the initial UL BWP is an uplink bandwidth part configured by the network device in a public configuration information element of the serving cell of the UE; and the foregoing initial uplink bandwidth part may also be referred to as a cell defining uplink bandwidth part; or a first active uplink bandwidth part (First Active UL BWP) of the user equipment in the serving cell, where when the serving cell of the UE corresponding to the first active UL BWP is activated, the first uplink bandwidth part that is of the serving cell and that is synchronously activated is configured by the network device in a dedicated configuration information element of the serving cell; or a default uplink bandwidth part (Default UL BWP) of the user equipment in the serving cell, where the default UL BWP is an active uplink bandwidth part to which the UE backs off after no uplink data is transmitted in a period of time, and is configured by the network device in a cell-dedicated configuration information element of the serving cell; or one of uplink bandwidth parts that can be used to send the random access preamble and that is configured or indicated by the network device in a dedicated configuration information element of the serving cell for the user equipment.

The serving cell is a serving cell in which the UE sends the random access preamble.

S702. The user equipment sends the random access preamble on the fourth uplink bandwidth part.

S703. The user equipment receives a random access response message on the first downlink bandwidth part.

In other words, the network device sends the random access response message on the first downlink bandwidth part.

The first downlink bandwidth part is a downlink bandwidth part corresponding to the fourth uplink bandwidth part of the user equipment. In other words, there is a correspondence between the first downlink bandwidth part and the fourth uplink bandwidth part.

Optionally, the correspondence between the first downlink bandwidth part and the fourth uplink bandwidth part may be configured in different manners.

In an optional implementation, the first downlink bandwidth part and the fourth uplink bandwidth part are configured by using a public configuration of the serving cell, that is, a downlink bandwidth part and an uplink bandwidth part that are configured in the public configuration of the serving cell have the foregoing correspondence.

In a further optional implementation, the public configuration of the serving cell is included in system information transmitted on the first downlink bandwidth part.

In another further optional implementation, the public configuration of the serving cell is included in dedicated signaling sent by the network device to the UE.

In another optional implementation, the correspondence between the first downlink bandwidth part and the fourth uplink bandwidth part is configured by using a dedicated configuration of the serving cell.

Specifically, in the cell-dedicated configuration of the serving cell, the network device indicates a downlink bandwidth part and an uplink bandwidth part that have the foregoing correspondence. For example, a first active downlink bandwidth part and a first active uplink bandwidth part are a downlink bandwidth part and an uplink bandwidth part that have the foregoing correspondence. Alternatively, a default downlink bandwidth part and a default uplink bandwidth part are a downlink bandwidth part and an uplink bandwidth part that have the foregoing correspondence.

The following steps S304 and S305 are optional steps, and are performed when the random access is contention-based random access.

S704. The user equipment sends a random access process message 3 on the fourth uplink bandwidth part.

S705. The network device receives, on the first downlink bandwidth part, a physical downlink control channel for scheduling retransmission of the random access process message 3 and transmission of a random access process message 4.

In an optional implementation, when the user equipment meets any one of the following conditions, if an active uplink bandwidth part of the user equipment in the serving cell is a fifth uplink bandwidth part, the user equipment activates the fourth uplink bandwidth part and deactivates the fifth uplink bandwidth part, or the user equipment switches from the fifth uplink bandwidth part to the fourth uplink bandwidth part:

(1) when a time alignment timer TAT associated with the serving cell of the user equipment expires;

(2) when a quantity of times for which the user equipment sends a scheduling request reaches a maximum allowable transmission quantity;

(3) when the user equipment receives signaling that is sent by the network device and that instructs the user equipment to initiate the random access process;

(4) when the user equipment performs the random access process;

(5) when the user equipment selects the random access preamble and the random access channel resource; and (6) when the user equipment sends the random access preamble.

In another optional implementation, when the user equipment needs to initiate a random access process, if an active uplink bandwidth part of the user equipment in the serving cell is a fifth uplink bandwidth part, the user equipment activates the fourth uplink bandwidth part and deactivates the fifth uplink bandwidth part, or the user equipment switches from the fifth uplink bandwidth part to the fourth uplink bandwidth part. After completing activation of the fourth bandwidth part, the user equipment starts a process of selecting the random access preamble and the random access channel resource, or starts the random access process.

In another optional implementation, when the user equipment meets any one of the following conditions, if an active downlink bandwidth part of the user equipment in the serving cell is a second downlink bandwidth part, that is, the active downlink bandwidth part is not the first downlink bandwidth part corresponding to the fourth uplink bandwidth part, the user equipment activates the first downlink bandwidth part and deactivates the second downlink bandwidth part, or the user equipment switches from the second downlink bandwidth part to the first downlink bandwidth part:

(1) when the time alignment timer TAT associated with the serving cell of the user equipment expires;

(2) when the quantity of times for which the user equipment sends the scheduling request reaches the maximum allowable transmission quantity;

(3) when the user equipment receives the signaling that is sent by the network device and that instructs the user equipment to initiate the random access process;

(4) when the user equipment performs the random access process;

(5) when the user equipment starts to receive the random access response message; and (6) when the user equipment completes sending of the random access preamble.

In another optional implementation, when the user equipment performs a random access process, if an active downlink bandwidth part of the user equipment in the serving cell is a second downlink bandwidth part, that is, the active downlink bandwidth part is not a downlink bandwidth part corresponding to the fourth uplink bandwidth part, before starting to receive the random access response message, the user equipment needs to complete an operation of activating the first downlink bandwidth part and deactivating the second downlink bandwidth part, or complete switching of the user equipment from the second downlink bandwidth part to the first downlink bandwidth part. The "before starting to receive the random access response" may be specifically before starting a receive window for the random access response.

Optionally, the deactivating the second downlink bandwidth part may be specifically:

if a first timer configured in the serving cell of the user equipment is running, the user equipment stops the first timer, or the user equipment stops and resets the first timer, where the first timer is configured to: if the first timer expires, the user equipment activates a default downlink bandwidth part in the serving cell, or the user equipment switches from an active downlink bandwidth part to a default downlink bandwidth part in the serving cell.

Further, when random access contention resolution succeeds, the user equipment starts or restarts the first timer; or when successfully receiving the random access response message, the user equipment starts or restarts the first timer.

In this embodiment, there is a correspondence between the uplink bandwidth part and the downlink bandwidth part, and the user equipment and the network device respectively send messages on the uplink bandwidth part and the downlink bandwidth part that have the correspondence. Therefore, the network device is prevented from sending the RAR or the like on all coordinated downlink bandwidth parts, thereby greatly saving downlink resources.

Figure 8:
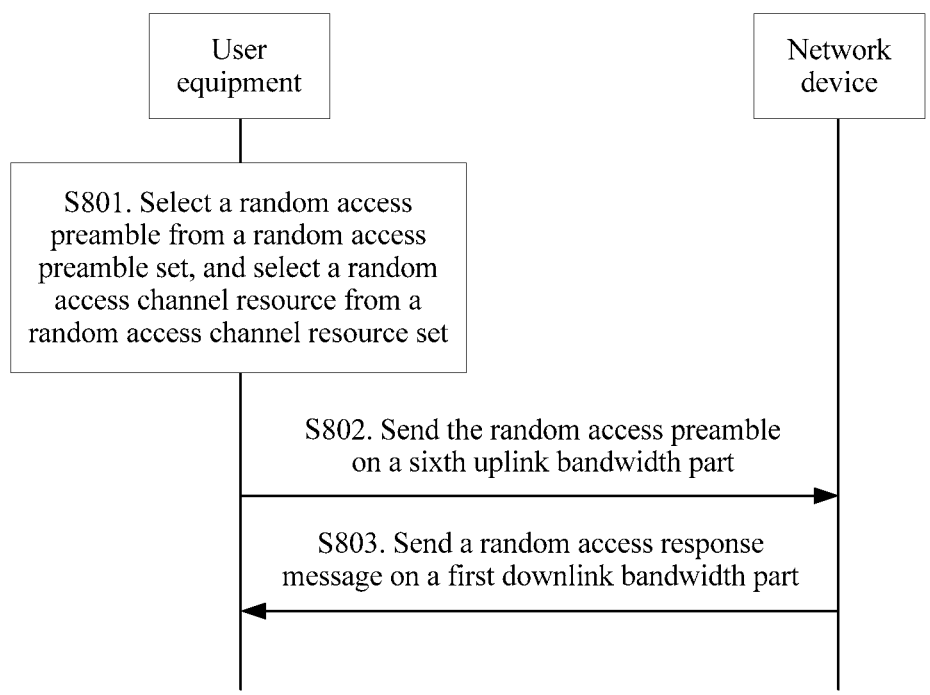
FIG. 8 is an interaction flowchart of Embodiment 3 of a random access processing method according to this application.

FIG. 8 is an interaction flowchart of Embodiment 3 of a random access processing method according to this application. As shown in FIG. 8, the random access process includes the following steps.

S801. User equipment selects a random access preamble from a random access preamble set, and selects a random access channel resource from a random access channel resource set.

Specifically, the random access preamble set and the random access channel resource set correspond to a first downlink bandwidth part. In other words, the random access preamble set and the random access channel resource set are in a correspondence with the first downlink bandwidth part. The correspondence herein may be specifically understood as follows: When the UE performs random access, the UE needs to select a random access channel resource from a random access channel resource set of an uplink bandwidth part configured for the UE, and select a random access preamble from a random access preamble set of the uplink bandwidth part, and the UE needs to receive an RAR message on the first downlink bandwidth part. Therefore, the random access channel resource set and the random access preamble set that are of the uplink bandwidth part are in a correspondence with the first downlink bandwidth part.

The random access preamble set is a random access preamble set of a sixth uplink bandwidth part.

A random access channel time domain resource in the random access channel resource set is a random access channel time domain resource of the sixth uplink bandwidth part.

A random access channel frequency domain resource in the random access channel resource set is a random access channel frequency domain resource of the sixth uplink bandwidth part.

The sixth uplink bandwidth part may be specifically:

an initial uplink bandwidth part (Initial UL BWP) of the user equipment in a serving cell, where the initial UL BWP may be (1) an initial UL BWP of the UE in an idle state, or may be (2) an initial UL BWP configured by the network device for the UE in a connected state; for (1), the initial UL BWP is an UL BWP configured in system information indicated by or associated with a cell defining synchronization signal block (Cell defining SS Block) in the serving cell of the UE; for (2), the initial UL BWP is an uplink bandwidth part configured by the network device in a public configuration information element of the serving cell of the UE; and the foregoing initial uplink bandwidth part may also be referred to as a cell defining uplink bandwidth part; or a first active uplink bandwidth part (First active UL BWP) of the user equipment in the serving cell, where when the serving cell of the UE corresponding to the first active UL BWP is activated, the first uplink bandwidth part that is of the serving cell and that is synchronously activated is configured by the network device in a dedicated configuration information element of the serving cell; or a default uplink bandwidth part (Default UL BWP) of the user equipment in the serving cell, where the default UL BWP is an active uplink bandwidth part to which the UE backs off after no uplink data is transmitted in a period of time, and is configured by the network device in a cell-dedicated configuration information element of the serving cell; or one of uplink bandwidth parts that can be used to send the random access preamble and that is configured or indicated by the network device in a dedicated configuration information element of the serving cell for the user equipment.

The serving cell is a serving cell in which the UE sends the random access preamble.

S802. The user equipment sends the random access preamble on the sixth uplink bandwidth part.

S803. The user equipment receives a random access response message on the first downlink bandwidth part.

The first downlink bandwidth part is a currently active downlink bandwidth part of the UE.

In an optional implementation, when the user equipment meets any one of the following conditions, if an active uplink bandwidth part of the user equipment in the serving cell is not the sixth uplink bandwidth part, the user equipment activates the sixth uplink bandwidth part and deactivates the current uplink bandwidth part, or the user equipment switches from the current uplink bandwidth part to the sixth uplink bandwidth part:

(1) when a time alignment timer TAT associated with the serving cell of the user equipment expires;

(2) when a quantity of times for which the user equipment sends a scheduling request reaches a maximum allowable transmission quantity;

(3) when the user equipment receives signaling that is sent by the network device and that instructs the user equipment to initiate the random access process;

(4) when the user equipment performs the random access process;

(5) when the user equipment selects the random access preamble and the random access channel resource; and (6) when the user equipment sends the random access preamble.

In another optional implementation, when the user equipment needs to initiate a random access process, if an active uplink bandwidth part of the user equipment in the serving cell is a fifth uplink bandwidth part, the user equipment activates the fourth uplink bandwidth part and deactivates the fifth uplink bandwidth part, or the user equipment switches from the fifth uplink bandwidth part to the fourth uplink bandwidth part. After completing activation of the fourth bandwidth part, the user equipment starts a process of selating the random access preamble and the random access channel resource, or starts the random access process.

Further, optionally, if the random access is non-contention-based random access, the user equipment performs uplink transmission on the sixth uplink bandwidth part, that is, sends uplink data and/or signaling to the network device. A physical resource used for the uplink transmission is a physical resource indicated by an uplink grant UL grant in the foregoing random access response message.

In this embodiment, the UE sends the random access preamble on the specific uplink bandwidth part, and receives the RAR on the currently active downlink bandwidth part. For non-contention-based random access, based on the method, the UE can be prevented from performing downlink BWP switching, and when there is downlink data to be received, it can be ensured that the UE receives the downlink data without interruption.

Figure 9:
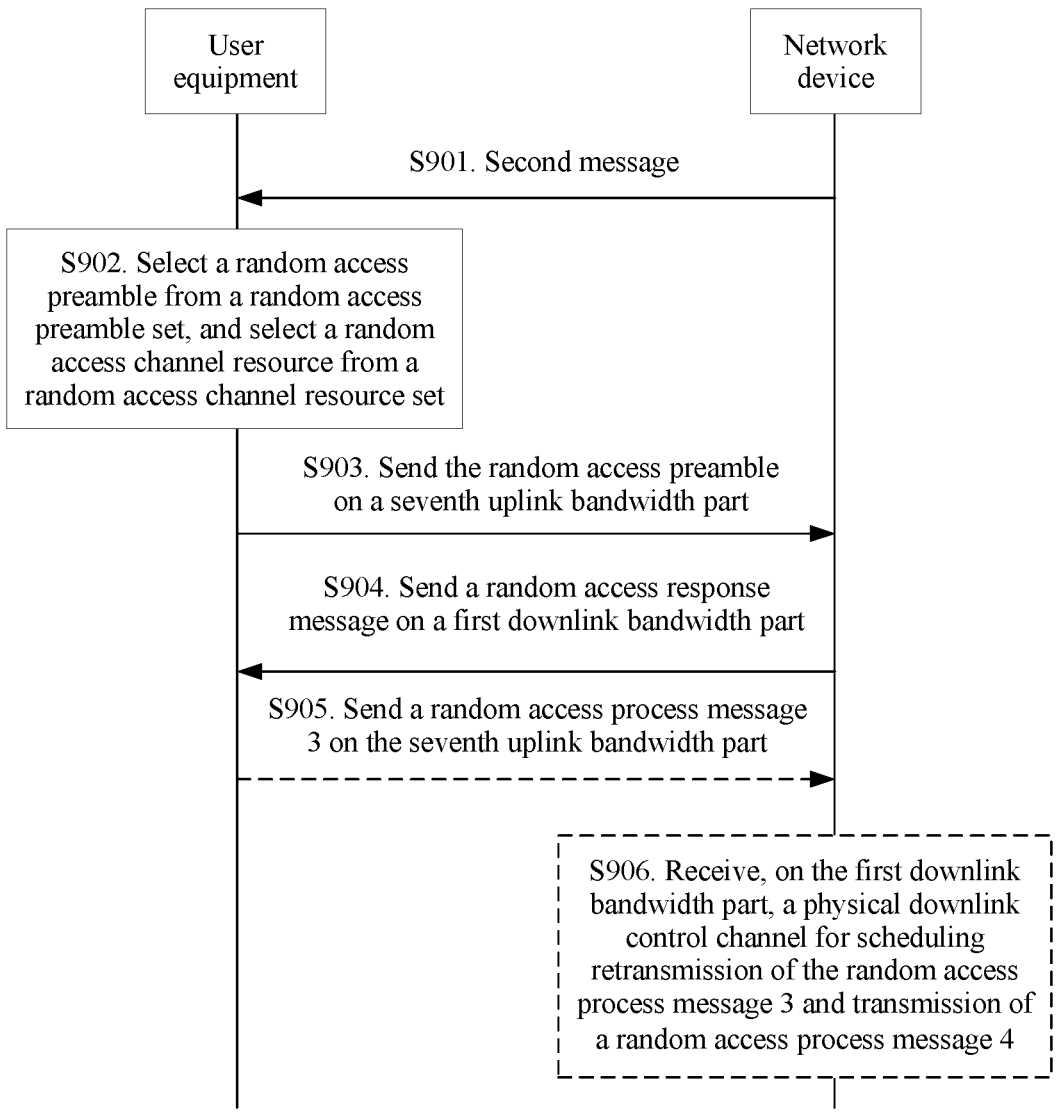
FIG. 9 is an interaction flowchart of Embodiment 4 of a random access processing method according to this application.

FIG. 9 is an interaction flowchart of Embodiment 4 of a random access processing method according to this application. As shown in FIG. 9, the random access process includes the following steps.

S901. A network device sends a second message to UE.

The second message includes configuration information indicating a correspondence between the first downlink bandwidth part and a seventh uplink bandwidth part. The second message may be specifically a radio resource reconfiguration message.

Specific implementations of the configuration information in the second message include the following implementations.

Implementation 1: A configuration information element of a downlink bandwidth part includes an identifier BWP ID of an uplink bandwidth part corresponding to the downlink bandwidth part. Optionally, the uplink bandwidth part is an uplink bandwidth part that is configured by the network device for the UE before the network device sends the first message.

Implementation 2: A configuration information element of a downlink bandwidth part includes a configuration information element of an uplink bandwidth part corresponding to the downlink bandwidth part. The configuration information element of the uplink bandwidth part includes BWP configuration information of the uplink bandwidth part. Optionally, the uplink bandwidth part is an uplink bandwidth part that is configured by the network device for the UE by using the second message.

Implementation 3: In the second message, a configuration of a downlink bandwidth part and a configuration of an uplink bandwidth part are included in a same BWP configuration information element.

The configuration information of the uplink bandwidth part includes at least one piece of the following information:

(1) A frequency domain location of the uplink bandwidth part;

(2) Bandwidth of the uplink bandwidth part; and (3) A bandwidth part identifier of the uplink bandwidth part.

Configuration information of the downlink bandwidth part includes at least one piece of the following information:

(1) A frequency domain location of the downlink bandwidth part;

(2) Bandwidth of the downlink bandwidth part; and (3) A bandwidth part identifier of the downlink bandwidth part.

S902. The user equipment selects a random access preamble from a random access preamble set, and selects a random access channel resource from a random access channel resource set.

Specifically, at least one of the random access preamble set or the random access channel resource set corresponds to the first downlink bandwidth part. In other words, there is a correspondence between the first downlink bandwidth part and at least one of the random access preamble set or the random access channel resource set. The correspondence herein may be specifically understood as follows: When the UE performs random access, if the UE needs to or can only receive an RAR on the first downlink BWP, the UE can only select a random access preamble from the foregoing random access preamble set for sending, or can only select a random access channel resource from the foregoing random access channel resource set, or can only select a random access preamble from the foregoing random access preamble set for sending and can only select a random access channel resource from the foregoing random access channel resource set.

The random access channel resource set includes at least one of a random access channel time domain resource or a random access channel frequency domain resource.

The first downlink bandwidth part is a downlink bandwidth part that is active when the user equipment performs the random access process. The foregoing "when the user equipment performs the random access process" may be explained as follows:

Explanation 1: when the UE initiates the random access process, including: (1) when a MAC entity of the UE triggers the random access process; (2) when RRC of the UE triggers the random access process; (3) when the UE receives a PDCCH indication sent by the network device and triggers the random access process; (4) when the UE receives RRC signaling sent by the network device and triggers the random access process.

Explanation 2: when the UE starts to perform the random access process.

Explanation 3: when the UE starts to open a window for listening to a random access response message.

Optionally, the random access channel frequency domain resource in the random access channel resource set is N physical resource blocks in a center of the seventh uplink bandwidth part, where N is a predefined positive integer.

The random access channel time domain resource in the random access channel resource set is a random access time domain resource of an eighth uplink bandwidth part of the user equipment.

The random access preamble set is a random access preamble set of the eighth uplink bandwidth part of the user equipment.

Further, the user equipment selects the random access channel and the random access preamble from the random access channel resource set and the random access preamble set that are determined based on the seventh uplink bandwidth part.

In an optional implementation, the eighth uplink bandwidth part may be specifically:

an initial uplink bandwidth part (Initial UL BWP) of the user equipment in a serving cell, where the initial UL BWP may be (1) an initial UL BWP of the UE in an idle state, or may be (2) an initial UL BWP configured by the network device for the UE in a connected state; for (1), the initial UL BWP is an UL BWP configured in system information indicated by or associated with a cell defining synchronization signal block (Cell defining SS Block) in the serving cell of the UE; for (2), the initial UL BWP is an uplink bandwidth part configured by the network device in a public configuration information element of the serving cell of the UE; and the foregoing initial uplink bandwidth part may also be referred to as a cell defining uplink bandwidth part; or a first active uplink bandwidth part (First active UL BWP) of the user equipment in the serving cell, where when the serving cell of the UE corresponding to the first active UL BWP is activated, the first uplink bandwidth part that is of the serving cell and that is synchronously activated is configured by the network device in a dedicated configuration information element of the serving cell; or a default uplink bandwidth part (Default UL BWP) of the user equipment in the serving cell, where the default UL BWP is an active uplink bandwidth part to which the UE backs off after no uplink data is transmitted in a period of time, and is configured by the network device in a cell-dedicated configuration information element of the serving cell; or one of uplink bandwidth parts that can be used to send the random access preamble and that is configured or indicated by the network device in a dedicated configuration information element of the serving cell for the user equipment.

The serving cell is a serving cell in which the UE sends the random access preamble.

S903. The user equipment sends the random access preamble on the seventh uplink bandwidth part.

If an uplink bandwidth part that is active when the user equipment performs the random access process is a ninth uplink bandwidth part, that is, the active uplink bandwidth part is not the uplink bandwidth part corresponding to the first downlink bandwidth part, the user equipment activates the seventh uplink bandwidth part and deactivates the ninth uplink bandwidth part, or the user equipment switches from the ninth uplink bandwidth part to the seventh uplink bandwidth part.

Correspondingly, the sending, by the user equipment, the random access preamble by using the random access channel resource includes:

sending, by the user equipment, the random access preamble on the seventh uplink bandwidth part by using the random access channel resource.

S904. The user equipment receives a random access response message on the first downlink bandwidth part.

The following steps S905 and S906 are optional steps, and are performed when the random access is contention-based random access.

S905. The user equipment sends a random access process message 3 on the seventh uplink bandwidth part.

S906. The user equipment receives, on the first downlink bandwidth part, a physical downlink control channel for scheduling retransmission of the random access process message 3 and transmission of a random access process message 4.

In an optional implementation, if the user equipment receives, on the first downlink bandwidth part in the random access process, control signaling that instructs the UE to perform downlink BWP switching, that is, deactivate the first downlink bandwidth part and activate a new downlink bandwidth part, the UE needs to determine an uplink bandwidth part corresponding to the new downlink bandwidth part. If the uplink bandwidth part corresponding to the new DL is the same as the uplink bandwidth part corresponding to the first downlink bandwidth part, or random access information of the uplink bandwidth part corresponding to the new DL is the same as random access information corresponding to the first downlink bandwidth part, the UE continues the current random access process; otherwise, the UE re-initiates a random access process and keeps a value of a variable and a value of a timer unchanged in the random access process.

In this embodiment, the network device sends the second message to the user equipment in advance, to configure the uplink bandwidth part corresponding to the first downlink bandwidth part; and the user equipment determines the random access preamble and the random access channel based on the uplink bandwidth part, and receives the RAR on the first downlink bandwidth part. In other words, the user equipment and the network device send messages on a corresponding random access channel based on the predetermined configuration, so that the network device is prevented from sending the RAR or the like on all coordinated downlink bandwidth parts, thereby greatly saving downlink resources.

Figure 10:
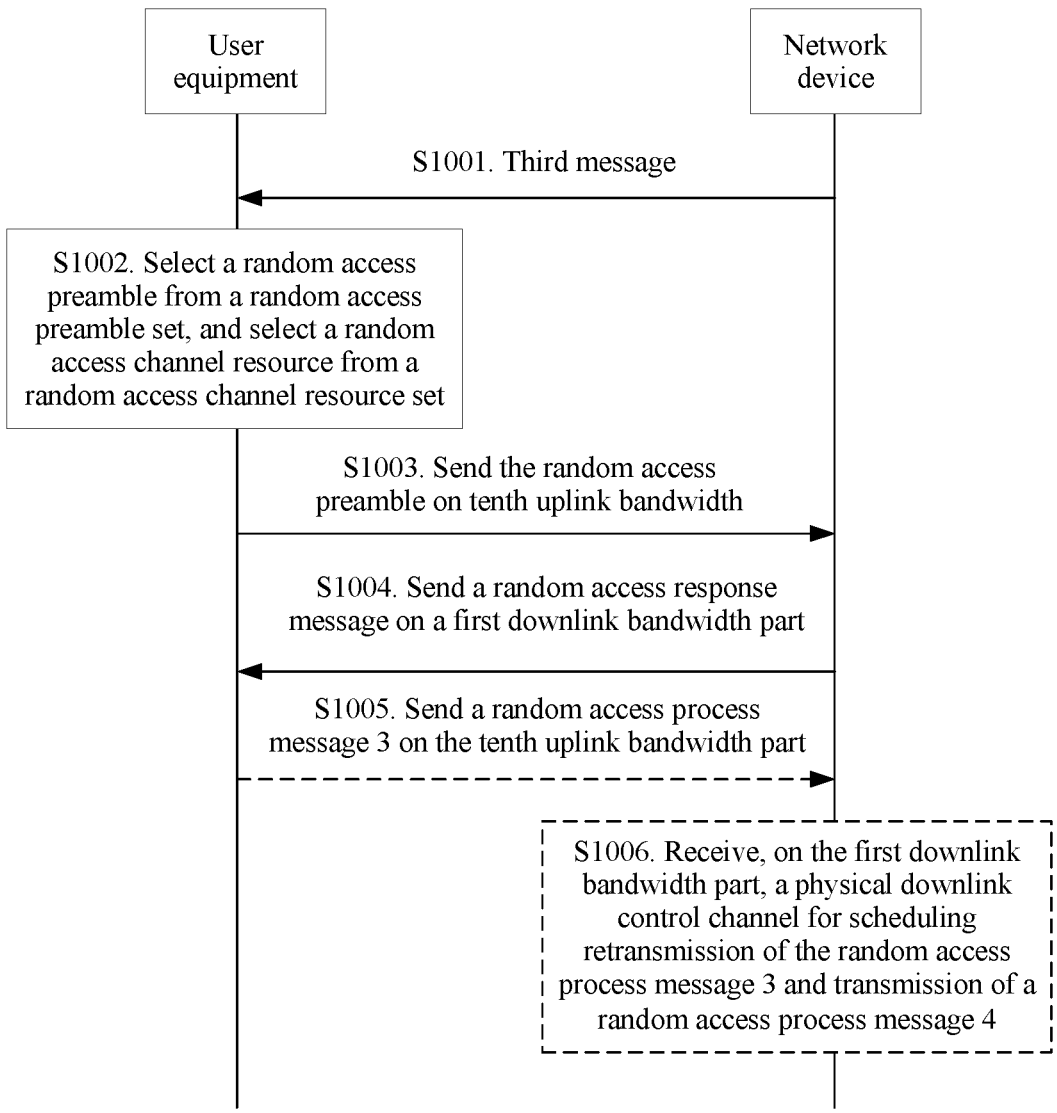
FIG. 10 is an interaction flowchart of Embodiment 5 of a random access processing method according to this application.

FIG. 10 is an interaction flowchart of Embodiment 5 of a random access processing method according to this application. As shown in FIG. 10, the random access process includes the following steps.

S1001. A network device sends a third message to UE.

The third message includes random access information and configuration information indicating a correspondence between the first downlink bandwidth part and the random access information. The third message may be specifically a radio resource reconfiguration message.

A specific implementation of the configuration information in the third message includes: A configuration information element in the first downlink bandwidth part includes the random access information corresponding to the first downlink bandwidth part.

The random access information includes at least one piece of the following information:

(1) Fourth configuration information of random access that is used to indicate a random access channel frequency domain resource. Specifically, a location of the random access channel frequency domain resource, that is, a quantity and locations of physical resource blocks occupied by a random access channel in frequency domain, may be determined based on the fourth configuration information.

(2) Fifth configuration information of random access that is used to indicate a random access channel time domain resource. Specifically, a location of the random access channel time domain resource, that is, a frame number and an occupied symbol, a mini-slot, a slot, or numbers and a quantity of subframes of a random access channel in time domain may be determined based on the fifth configuration information.

(3) Sixth configuration information of random access that is used to indicate a random access preamble set. Specifically, an identifier ID of an available random access preamble may be determined based on the sixth configuration information.

The fourth configuration information, the fifth configuration information, and the sixth configuration information may be respectively configuration information of a specific random access channel frequency domain resource, configuration information of a specific random access channel time domain resource, and configuration information of a specific random access channel preamble, or may be a random access configuration identifier ID. The random access channel frequency domain resource, the random access channel time domain resource, and the random access channel preamble that correspond to the random access configuration identifier ID are preconfigured or predefined by the network device. Therefore, the UE may determine, based on the ID, the random access channel frequency domain resource, the random access channel time domain resource, and the random access channel preamble.

S1002. The user equipment selects a random access preamble from a random access preamble set, and selects a random access channel from a random access channel resource set.

Specifically, at least one of the random access preamble set or the random access channel resource set corresponds to the first downlink bandwidth part. In other words, there is a correspondence between the first downlink bandwidth part and at least one of the random access preamble set or the random access channel resource set. The correspondence herein may be specifically understood as follows: When the UE performs random access, if the UE needs to or can only receive an RAR on the first downlink BWP, the UE can only select a random access preamble from the foregoing random access preamble set for sending, or can only select a random access channel resource from the foregoing random access channel resource set, or can only select a random access preamble from the foregoing random access preamble set for sending and can only select a random access channel resource from the foregoing random access channel resource set.

The random access channel resource set includes at least one of a random access channel time domain resource or a random access channel frequency domain resource.

The first downlink bandwidth part is a downlink bandwidth part that is active when the user equipment performs the random access process. The foregoing "when the user equipment performs the random access process" may be explained as follows:

Explanation 1: when the UE initiates the random access process, including: (1) when a MAC entity of the UE triggers the random access process; (2) when RRC of the UE triggers the random access process; (3) when the UE receives a PDCCH indication sent by the network device and triggers the random access process; (4) when the UE receives RRC signaling sent by the network device and triggers the random access process.

Explanation 2: when the UE starts to perform the random access process.

Explanation 3: when the UE starts to open a window for listening to a random access response message.

The following separately describes methods for determining the random access channel resource set and the random access preamble set when the random access information corresponding to the first downlink bandwidth part is different.

1. The random access configuration includes only the fourth configuration information.

In this case, the random access channel frequency domain resource in the foregoing random access channel resource set is the random access channel frequency domain resource indicated by the fourth configuration information;

the random access channel time domain resource in the foregoing random access channel resource set is the same as a random access channel time domain resource corresponding to a third downlink bandwidth part of the user equipment; and the foregoing random access preamble set is the same as a random access preamble set corresponding to the third downlink bandwidth part of the user equipment.

2. The random access configuration includes only the fifth configuration information.

In this case, the random access channel time domain resource in the foregoing random access channel resource set is the random access channel time domain resource indicated by the fifth configuration information;

the random access channel frequency domain resource in the foregoing random access channel resource set is the same as a random access channel frequency domain resource corresponding to a third downlink bandwidth part of the user equipment; and the foregoing random access preamble set is the same as a random access preamble set corresponding to the third downlink bandwidth part of the user equipment.

3. The random access configuration includes only the sixth configuration information.

In this case, the random access channel frequency domain resource in the foregoing random access channel resource set is a random access channel frequency domain resource corresponding to a third downlink bandwidth part of the user equipment;

the random access channel time domain resource in the foregoing random access channel resource set is the same as a random access channel time domain resource corresponding to the third downlink bandwidth part of the user equipment; and the foregoing random access preamble set is the random access preamble set indicated by the sixth configuration information.

4. The random access configuration includes the fourth configuration information and the fifth configuration information.

In this case, the random access channel frequency domain resource in the foregoing random access channel resource set is the random access channel frequency domain resource indicated by the fourth configuration information;

the random access channel time domain resource in the foregoing random access channel resource set is the random access channel time domain resource indicated by the fifth configuration information; and the foregoing random access preamble set is the same as a random access preamble set corresponding to the third downlink bandwidth part of the user equipment.

5. The random access configuration includes the fourth configuration information and the sixth configuration information.

In this case, the random access channel frequency domain resource in the foregoing random access channel resource set is the random access channel frequency domain resource indicated by the fourth configuration information;

the foregoing random access preamble set is the random access preamble set indicated by the sixth configuration information; and the random access channel time domain resource in the foregoing random access channel resource set is the same as a random access channel time domain resource corresponding to a third downlink bandwidth part of the user equipment.

6. The random access configuration includes the fifth configuration information and the sixth configuration information.

In this case, the random access channel time domain resource in the foregoing random access channel resource set is the random access channel time domain resource indicated by the fifth configuration information;

the foregoing random access preamble set is the random access preamble set indicated by the sixth configuration information; and the random access channel frequency domain resource in the foregoing random access channel resource set is the same as a random access channel frequency domain resource corresponding to a third downlink bandwidth part of the user equipment.

7. The random access configuration includes the fourth configuration information, the fifth configuration information, and the sixth configuration information.

In this case, the random access channel frequency domain resource in the foregoing random access channel resource set is the random access channel frequency domain resource indicated by the fourth configuration information;

the random access channel time domain resource in the foregoing random access channel resource set is the random access channel time domain resource indicated by the fifth configuration information; and the foregoing random access preamble set is the random access preamble set indicated by the sixth configuration information.

Optionally, the "third downlink bandwidth part" involved in the foregoing cases may be specifically the following uplink bandwidth part:

an initial uplink bandwidth part (Initial UL BWP) of the user equipment in a serving cell, where the initial UL BWP may be (1) an initial UL BWP of the UE in an idle state, or may be (2) an initial UL BWP configured by the network device for the UE in a connected state; for (1), the initial UL BWP is an UL BWP configured in system information indicated by or associated with a cell defining synchronization signal block (Cell defining SS Block) in the serving cell of the UE; for (2), the initial UL BWP is an uplink bandwidth part configured by the network device in a public configuration information element of the serving cell of the UE; and the foregoing initial uplink bandwidth part may also be referred to as a cell defining uplink bandwidth part; or a first active uplink bandwidth part (First active UL BWP) of the user equipment in the serving cell, where when the serving cell of the UE corresponding to the first active UL BWP is activated, the first uplink bandwidth part that is of the serving cell and that is synchronously activated is configured by the network device in a dedicated configuration information element of the serving cell; or a default uplink bandwidth part (Default UL BWP) of the user equipment in the serving cell, where the default UL BWP is an active uplink bandwidth part to which the UE backs off after no uplink data is transmitted in a period of time, and is configured by the network device in a cell-dedicated configuration information element of the serving cell; or one of uplink bandwidth parts that can be used to send the random access preamble and that is configured or indicated by the network device in a dedicated configuration information element of the serving cell for the user equipment.

The serving cell is a serving cell in which the UE sends the random access preamble.

Further, when one of the foregoing cases occurs, the user equipment determines the random access channel resource set and the random access preamble set in a manner of the case based on the specific configuration information in the third message, and selects the random access preamble and the random access channel from the random access channel resource set and the random access preamble set.

S1003. The user equipment sends the random access preamble on tenth uplink bandwidth.

The tenth uplink bandwidth part includes the random access channel frequency domain resource in the foregoing random access channel resource set.

If an uplink bandwidth part that is active when the user equipment performs the random access process is an eleventh uplink bandwidth part, that is, the active uplink bandwidth part is not the uplink bandwidth part corresponding to the first downlink bandwidth part, the user equipment activates the tenth uplink bandwidth part and deactivates the eleventh uplink bandwidth part, or the user equipment switches from the eleventh uplink bandwidth part to the tenth uplink bandwidth part.

Correspondingly, the sending, by the user equipment, the random access preamble by using the random access channel resource includes:

sending, by the user equipment, the random access preamble on the tenth uplink bandwidth part by using the random access channel resource.

S1004. The network device sends a random access response message on the first downlink bandwidth part.

The following steps S1005 and S1006 are optional steps, and are performed when the random access is contention-based random access.

S1005. The user equipment sends a random access process message 3 on the tenth uplink bandwidth part.

S1006. The network device receives, on the first downlink bandwidth part, a physical downlink control channel for scheduling retransmission of the random access process message 3 and transmission of a random access process message 4.

In an optional implementation, if the user equipment receives, on the first downlink bandwidth part in the random access process, control signaling that instructs the UE to perform downlink BWP switching, that is, deactivate the first downlink bandwidth part and activate a new downlink bandwidth part, the UE needs to determine random access information corresponding to the new downlink bandwidth part. If the random access information corresponding to the new DL is the same as the random access information corresponding to the first downlink bandwidth part, the UE continues the current random access process; otherwise, the UE re-initiates a random access process and keeps a value of a variable and a value of a timer unchanged in the random access process.

In this embodiment, the network device sends the first message to the user equipment in advance, to configure the random access information corresponding to the first downlink bandwidth part; and the user equipment determines the random access preamble and the random access channel based on the random access information, and receives the RAR on the first downlink bandwidth part. In other words, the user equipment and the network device send messages on a corresponding random access channel based on the predetermined configuration, so that the network device is prevented from sending the RAR or the like on all coordinated downlink bandwidth parts, thereby greatly saving downlink resources.

Figure 11:
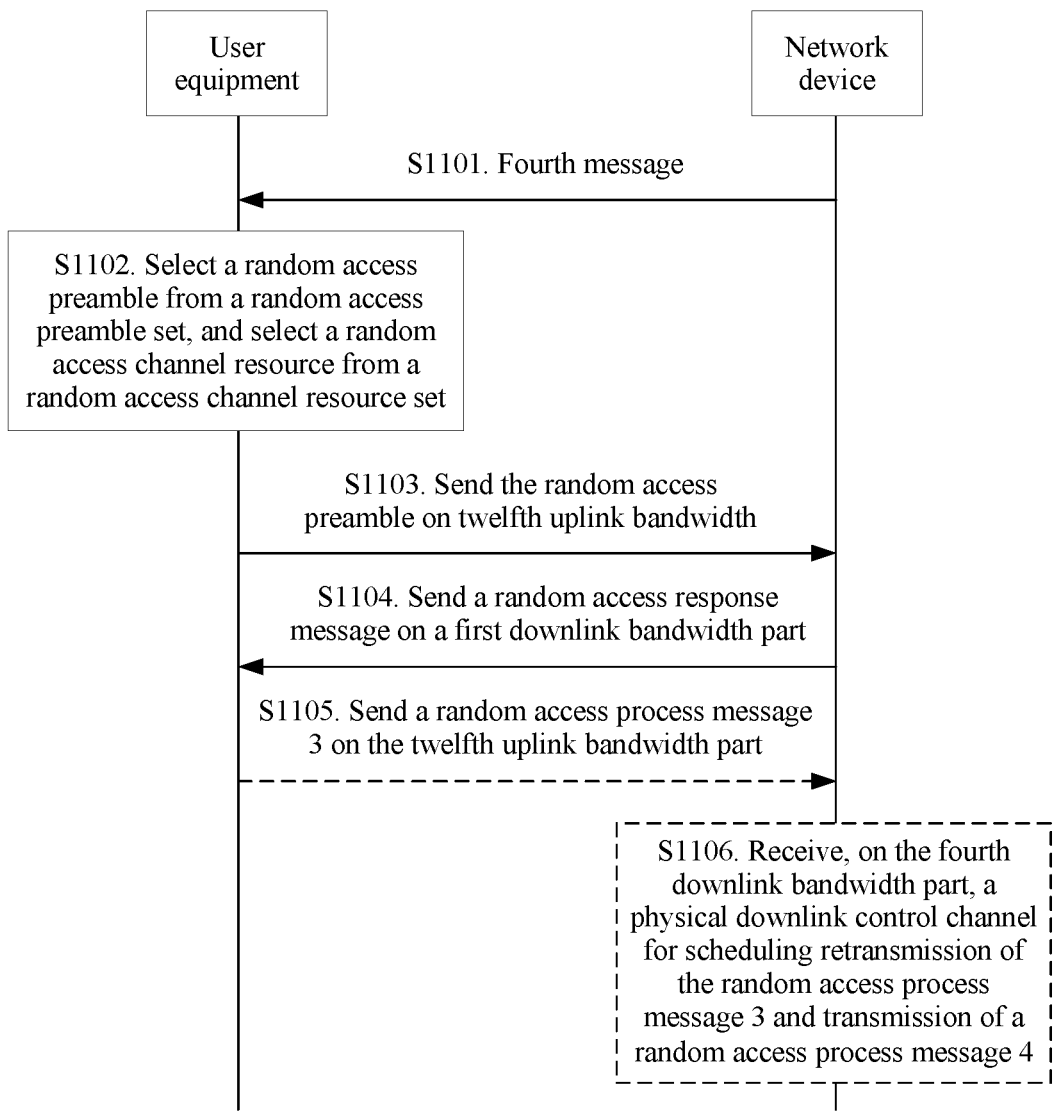
FIG. 11 is an interaction flowchart of Embodiment 6 of a random access processing method according to this application.

FIG. 11 is an interaction flowchart of Embodiment 6 of a random access processing method according to this application. As shown in FIG. 11, the random access process includes the following steps.

S1101. A network device sends a fourth message to user equipment.

The fourth message includes configuration information indicating a correspondence between a twelfth uplink bandwidth part and a first downlink bandwidth part. The fourth message may be specifically a radio resource reconfiguration message.

Specific implementations of the configuration information in the fourth message include the following implementations.

Implementation 1: A configuration information element of an uplink bandwidth part includes random access information of the uplink bandwidth part and an identifier BWP ID of a downlink bandwidth part corresponding to the uplink bandwidth part.

Implementation 2: A configuration information element of an uplink bandwidth part includes random access information of the uplink bandwidth part and configuration information of a downlink bandwidth part corresponding to the uplink bandwidth part.

Implementation 3: In the fourth message, configuration information of an uplink bandwidth part and configuration information of a DL BWP corresponding to the uplink bandwidth part are included in a same BWP configuration information element. Random access information of the uplink bandwidth part is included in a random access configuration information element, and the random access configuration information element includes a BWP ID of the uplink bandwidth part.

The configuration information of the uplink bandwidth part includes at least one piece of the following information:

(1) A frequency domain location of the uplink bandwidth part;

(2) Bandwidth of the uplink bandwidth part; and (3) The bandwidth part identifier BWP ID of the uplink bandwidth part.

The configuration information of the downlink bandwidth part corresponding to the uplink bandwidth part includes at least one piece of the following information:

(1) A frequency domain location of the downlink bandwidth part;

(2) Bandwidth of the downlink bandwidth part; and (3) A bandwidth part identifier BWP ID of the downlink bandwidth part.

The foregoing random access information includes at least one piece of the following information:

(1) First configuration information of random access that is used to indicate a random access channel frequency domain resource. Specifically, a location of the random access channel frequency domain resource, that is, a quantity and locations of physical resource blocks occupied by a random access channel in frequency domain, may be determined based on the first configuration information.

(2) Second configuration information of random access that is used to indicate a random access channel time domain resource. Specifically, a location of the random access channel time domain resource, that is, a frame number and an occupied symbol, a mini-slot, a slot, or numbers and a quantity of subframes of a random access channel in time domain may be determined based on the second configuration information.

(3) Third configuration information of random access that is used to indicate a random access preamble set. Specifically, an identifier ID of an available random access preamble may be determined based on the third configuration information.

The first configuration information, the second configuration information, and the third configuration information may be respectively configuration information of a specific random access channel frequency domain resource, configuration information of a specific random access channel time domain resource, and configuration information of a specific random access channel preamble, or may be a random access configuration identifier ID. The random access channel frequency domain resource, the random access channel time domain resource, and the random access channel preamble that correspond to the random access configuration identifier ID are preconfigured or predefined by the network device. Therefore, the UE may determine, based on the ID, the random access channel frequency domain resource, the random access channel time domain resource, and the random access channel preamble.

S1102. The user equipment selects a random access preamble from a random access preamble set, and selects a random access channel resource from a random access channel resource set.

Specifically, at least one of the random access preamble set or the random access channel resource set corresponds to the first downlink bandwidth part. In other words, there is a correspondence between the first downlink bandwidth part and at least one of the random access preamble set or the random access channel resource set. The correspondence herein may be specifically understood as follows: When the UE performs random access, if the UE needs to or can only receive an RAR on the first downlink BWP, the UE can only select a random access preamble from the foregoing random access preamble set for sending, or can only select a random access channel resource from the foregoing random access channel resource set, or can only select a random access preamble from the foregoing random access preamble set for sending and can only select a random access channel resource from the foregoing random access channel resource set.

The random access channel resource set includes at least one of a random access channel time domain resource or a random access channel frequency domain location.

The first downlink bandwidth part is a downlink bandwidth part corresponding to the twelfth uplink bandwidth part of the user equipment.

The twelfth uplink bandwidth part is an uplink bandwidth part that is active when the user equipment performs random access.

The following separately describes processes of composing the random access channel resource set and the random access preamble set when random access configuration information of the twelfth uplink bandwidth part is different.

1. The random access configuration information of the twelfth uplink bandwidth part includes only seventh configuration information.

In this case, the random access channel frequency domain resource in the foregoing random access channel resource set is a random access channel frequency domain resource indicated by the seventh configuration information of random access;

the random access channel time domain resource in the foregoing random access channel resource set is the same as a random access channel time domain resource of a thirteenth uplink bandwidth part of the user equipment; and the foregoing random access preamble set is the same as a random access preamble set of the thirteenth uplink bandwidth part of the user equipment.

2. The random access configuration information of the twelfth uplink bandwidth part includes only eighth configuration information.

In this case, the random access channel time domain resource in the foregoing random access channel resource set is a random access channel time domain resource indicated by the eighth configuration information of random access;

the random access channel frequency domain resource in the foregoing random access channel resource set is N physical resource blocks in a center of the twelfth uplink bandwidth part, where N is a predefined positive integer; and the foregoing random access preamble set is the same as a random access preamble set of a thirteenth uplink bandwidth part of the user equipment.

3. The random access configuration information of the twelfth uplink bandwidth part includes only ninth configuration information.

In this case, the foregoing random access preamble set is a random access preamble set indicated by the ninth configuration information of random access;

the random access channel frequency domain resource in the foregoing random access channel resource set is N physical resource blocks in a center of the twelfth uplink bandwidth part, where N is a predefined positive integer; and the random access channel time domain resource in the foregoing random access channel resource set is the same as a random access time domain resource of a thirteenth uplink bandwidth part of the user equipment.

4. The random access configuration information of the twelfth uplink bandwidth part includes seventh configuration information and eighth configuration information.

In this case, the random access channel frequency domain resource in the foregoing random access channel resource set is a random access channel frequency domain resource indicated by the seventh configuration information of random access;

the random access channel time domain resource in the foregoing random access channel resource set is the same as a random access channel time domain resource indicated by the eighth configuration information of random access; and the foregoing random access preamble set is the same as a random access preamble set of a thirteenth uplink bandwidth part of the user equipment.

5. The random access configuration information of the twelfth uplink bandwidth part includes seventh configuration information and ninth configuration information.

In this case, the random access channel frequency domain resource in the foregoing random access channel resource set is a random access channel frequency domain resource indicated by the seventh configuration information of random access;

the foregoing random access preamble set is a random access preamble set indicated by the ninth configuration information of random access; and the random access channel time domain resource in the foregoing random access channel resource set is the same as a random access channel time domain resource of a thirteenth uplink bandwidth part of the user equipment.

6. The random access configuration information of the twelfth uplink bandwidth part includes eighth configuration information and ninth configuration information.

In this case, the random access channel time domain resource in the foregoing random access channel resource set is a random access channel time domain resource indicated by the eighth configuration information of random access;

the foregoing random access preamble set is a random access preamble set indicated by the ninth configuration information of random access; and the random access channel frequency domain resource in the foregoing random access channel resource set is N physical resource blocks in a center of the twelfth uplink bandwidth part, where N is a predefined positive integer.

7. The random access configuration information of the twelfth uplink bandwidth part includes seventh configuration information, eighth configuration information, and ninth configuration information.

In this case, the random access channel frequency domain resource in the foregoing random access channel resource set is a random access channel frequency domain resource indicated by the seventh configuration information of random access;

the random access channel time domain resource in the foregoing random access channel resource set is a random access channel time domain resource indicated by the eighth configuration information of random access; and the foregoing random access preamble set is a random access preamble set indicated by the ninth configuration information of random access.

Optionally, the "thirteenth uplink bandwidth part" involved in the foregoing cases may be specifically the following uplink bandwidth part:

an initial uplink bandwidth part (initial UL BWP) of the user equipment in a serving cell, where the initial UL BWP may be (1) an initial UL BWP of the UE in an idle state, or may be (2) an initial UL BWP configured by the network device for the UE in a connected state; for (1), the initial UL BWP is an UL BWP configured in system information indicated by or associated with a cell defining synchronization signal block (Cell defining SS Block) in the serving cell of the UE; for (2), the initial UL BWP is an uplink bandwidth part configured by the network device in a public configuration information element of the serving cell of the UE; and the foregoing initial uplink bandwidth part may also be referred to as a cell defining uplink bandwidth part; or a first active uplink bandwidth part (first active UL BWP) of the user equipment in the serving cell, where when the serving cell of the UE corresponding to the first active UL BWP is activated, the first uplink bandwidth part that is of the serving cell and that is synchronously activated is configured by the network device in a dedicated configuration information element of the serving cell; or a default uplink bandwidth part (default UL BWP) of the user equipment in the serving cell, where the default UL BWP is an active uplink bandwidth part to which the UE backs off after no uplink data is transmitted in a period of time, and is configured by the network device in a cell-dedicated configuration information element of the serving cell; or one of uplink bandwidth parts that can be used to send the random access preamble and that is configured or indicated by the network device in a dedicated configuration information element of the serving cell for the user equipment.

The serving cell is a serving cell in which the UE sends the random access preamble.

Further, when one of the foregoing cases occurs, the user equipment determines the random access channel resource set and the random access preamble set in a manner of the case based on the specific configuration information in the fourth message, and selects the random access preamble and the random access channel from the random access channel resource set and the random access preamble set.

S1103. The user equipment sends the random access preamble on the twelfth uplink bandwidth.

S1104. The user equipment receives an RAR on the first downlink bandwidth part.

If a downlink bandwidth part that is active when the user equipment performs the random access process is a fourth downlink bandwidth part, that is, the active downlink bandwidth part is not the downlink bandwidth part corresponding to the twelfth uplink bandwidth part, the user equipment activates the first downlink bandwidth part and deactivates the fourth downlink bandwidth part, or the user equipment switches from the fourth downlink bandwidth part to the first downlink bandwidth part.

The following steps S1105 and S1106 are optional steps, and are performed when the random access is contention-based random access.

S1105. The user equipment sends a random access process message 3 on the twelfth uplink bandwidth part.

S1106. The user equipment receives, on the fourth downlink bandwidth part, a physical downlink control channel for scheduling retransmission of the random access process message 3 and transmission of a random access process message 4.

In this embodiment, the network device sends the fourth message to the user equipment in advance, to configure the random access information corresponding to the twelfth uplink bandwidth part; and the user equipment determines the random access preamble and the random access channel based on the random access information, and receives the RAR on the fourth downlink bandwidth part. In other words, the user equipment and the network device send messages on a corresponding random access channel based on the predetermined configuration, so that the network device is prevented from sending the RAR or the like on all coordinated downlink bandwidth parts, thereby greatly saving downlink resources.

It should be noted that the processing methods in the foregoing Embodiment 1 and Embodiment 3 may be combined for implementation. The processing methods in the foregoing Embodiment 2 and Embodiment 3 may be combined for implementation. The processing methods in the foregoing Embodiment 4 and Embodiment 3 may be combined for implementation. The processing methods in the foregoing Embodiment 5 and Embodiment 3 may be combined for implementation. The processing methods in the foregoing Embodiment 6 and Embodiment 3 may be combined for implementation. Details may be as follows:

if the user equipment performs a contention-based random access process, the processing method in Embodiment 2, the processing method in Embodiment 2, the processing method in Embodiment 4, the processing method in Embodiment 5, or the processing method in Embodiment 6 is used; or if the user equipment performs a non-contention-based random access process, the processing method in Embodiment 3 is used.

In addition, for the foregoing Embodiment 1, Embodiment 3, Embodiment 4, and Embodiment 5, that at least one of the random access preamble set or the random access channel resource set corresponds to the first downlink bandwidth part may be specifically:

at least one of the random access preamble set and the random access channel resource set corresponds to a first control resource set CORESET corresponding to the first downlink bandwidth part, and the first CORESET indicates a time-frequency domain resource set used by the user equipment to receive or search for a downlink control channel.

The downlink control channel is used to schedule any downlink transmission and/or uplink transmission, or the downlink control channel is used to schedule at least one of transmission of a random access process message 2, retransmission of a random access process message 3, and transmission of a random access process message 4.

In another embodiment, optionally, the serving cell of the user equipment in this application may be a primary serving cell PCell of the user equipment or a secondary serving cell SCell of the user equipment. The primary serving cell includes a primary serving cell in a master cell group MCG of the user equipment and a primary serving cell in a secondary cell group SCG of the user equipment.

Figure 12:
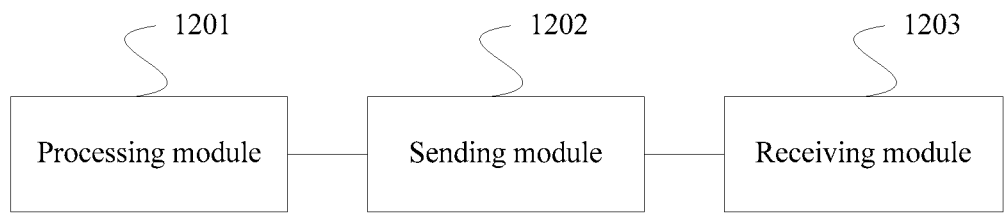
FIG. 12 is a structural diagram of modules of Embodiment 1 of user equipment according to this application.

FIG. 12 is a structural diagram of modules of Embodiment 1 of user equipment according to this application. As shown in FIG. 12, the user equipment includes a processing module 1201, a sending module 1202, and a receiving module 1203.

The processing module 1201 is configured to select a random access preamble from a random access preamble set, and select a random access channel resource from a random access channel resource set.

The sending module 1202 is configured to send the random access preamble by using the random access channel resource.

The receiving module is configured to receive a random access response message on a first downlink bandwidth part.

At least one of the random access preamble set or the random access channel resource set corresponds to the first downlink bandwidth part.

The random access channel resource includes at least one of a random access channel time domain resource or a random access channel frequency domain resource.

Further, the first downlink bandwidth part is a downlink bandwidth part that is active when the user equipment performs the random access process.

Further, that at least one of the random access preamble set or the random access channel resource set corresponds to the first downlink bandwidth part includes:

at least one of the random access preamble set and the random access channel resource set corresponds to a first control resource set of the first downlink bandwidth part, and the first control resource set indicates a time-frequency domain resource set used by the user equipment to receive or search for a downlink control channel; where the downlink control channel is used to schedule any downlink transmission and/or uplink transmission; or the downlink control channel is used to schedule at least one of transmission of a random access process message 2, retransmission of a random access process message 3, and transmission of a random access process message 4, where the random access process message 2 is a random access response message, the random access process message 3 is uplink transmission scheduled for the first time, and the random access process message 4 is a random access contention resolution message.

In an optional implementation, the receiving module 1203 is further configured to:

receive a first message sent by a network device, where the first message includes configuration information indicating a correspondence between the first downlink bandwidth part and a first uplink bandwidth part and includes random access information of the first uplink bandwidth part, or the first message includes configuration information indicating a correspondence between the first downlink bandwidth part and random access information and includes a first uplink bandwidth part corresponding to the random access information; where the random access information includes at least one piece of the following information:

first configuration information of random access that is used to indicate a random access channel frequency domain resource;

second configuration information of random access that is used to indicate a random access channel time domain resource; and third configuration information of random access that is used to indicate a random access preamble set.

Further, the random access information includes only the first configuration information.

Correspondingly, the random access channel frequency domain resource in the random access channel resource set is the random access channel frequency domain resource indicated by the first configuration information;

the random access channel time domain resource in the random access channel resource set is the same as a random access channel time domain resource configured on a second uplink bandwidth part of the user equipment; and the random access preamble set is the same as a random access preamble set configured on the second uplink bandwidth part of the user equipment.

Further, the random access information includes only the second configuration information.

Correspondingly, the random access channel time domain resource in the random access channel resource set is the random access channel time domain resource indicated by the second configuration information;

the random access channel frequency domain resource in the random access channel resource set is N physical resource blocks in a center of the first uplink bandwidth part, where N is a predefined positive integer; and the random access preamble set is the same as a random access preamble set configured on a second uplink bandwidth part of the user equipment.

Further, the random access information of the first uplink bandwidth part includes only the third configuration information.

Correspondingly, the random access preamble set is the random access preamble set indicated by the third configuration information;

the random access channel frequency domain resource in the random access channel resource set is N physical resource blocks in a center of the first uplink bandwidth part, where N is a predefined positive integer; and the random access channel time domain resource in the random access channel resource set is the same as a random access channel time domain resource configured on a second uplink bandwidth part of the user equipment.

Further, the random access information of the first uplink bandwidth part includes the first configuration information and the second configuration information.

Correspondingly, the random access channel frequency domain resource in the random access channel resource set is the random access channel frequency domain resource indicated by the first configuration information;

the random access channel time domain resource in the random access channel resource set is the random access channel time domain resource indicated by the second configuration information; and the random access preamble set is the same as a random access preamble set configured on a second uplink bandwidth part of the user equipment.

Further, the random access information of the first uplink bandwidth part includes the first configuration information and the third configuration information that are of random access.

Correspondingly, the random access channel frequency domain resource in the random access channel resource set is the random access channel frequency domain resource indicated by the first configuration information;

the random access preamble set is the random access preamble set indicated by the third configuration information of random access; and the random access channel time domain resource in the random access channel resource set is the same as a random access channel time domain resource configured on a second uplink bandwidth part of the user equipment.

Further, the random access information of the first uplink bandwidth part includes the second configuration information and the third configuration information.

Correspondingly, the random access channel time domain resource in the random access channel resource set is the random access channel time domain resource indicated by the second configuration information;

the random access preamble set is the random access preamble set indicated by the third configuration information; and the random access channel frequency domain resource in the random access channel resource set is N physical resource blocks in a center of the first uplink bandwidth part, where N is a predefined positive integer.

Further, the random access information of the first uplink bandwidth part includes the first configuration information, the second configuration information, and the third configuration information.

Correspondingly, the random access channel frequency domain resource in the random access channel resource set is the random access channel frequency domain resource indicated by the first configuration information;

the random access channel time domain resource in the random access channel resource set is the random access channel time domain resource indicated by the second configuration information; and the random access preamble set is the random access preamble set indicated by the third configuration information.

Further, the second uplink bandwidth part is:

an initial uplink bandwidth part of the user equipment in a serving cell; or a first active uplink bandwidth part of the user equipment in the serving cell; or a default uplink bandwidth part of the user equipment in the serving cell; or an uplink bandwidth part configured or indicated by the network device for the user equipment by using dedicated signaling; where the serving cell is a serving cell in which the user equipment sends the random access preamble.

Further, the sending module 1202 is specifically configured to:

send the random access preamble on the first uplink bandwidth part by using the random access channel resource.

Further, the processing module 1201 is further configured to:

when an uplink bandwidth part that is active when the user equipment performs the random access process is a third uplink bandwidth part, activate the first uplink bandwidth part and deactivate the third uplink bandwidth part, or switch from the third uplink bandwidth part to the first uplink bandwidth part.

Correspondingly, the sending module 1202 is specifically configured to:

send the random access preamble on the first uplink bandwidth part by using the random access channel resource.

Further, if the random access process is a contention-based random access process, the sending module 1202 is further configured to:

send a random access process message 3 on the first uplink bandwidth part.

Correspondingly, the receiving module 1203 is further configured to:

receive, on the first downlink bandwidth part, a physical downlink control channel for scheduling retransmission of the random access process message 3 and transmission of a random access process message 4.

In an optional implementation, the first downlink bandwidth part is a downlink bandwidth part corresponding to a fourth uplink bandwidth part of the user equipment.

The fourth uplink bandwidth part is an uplink bandwidth part that is of the user equipment in the serving cell and on which a random access preamble set and a random access channel resource set are configured.

The random access preamble set is the random access preamble set configured on the fourth uplink bandwidth part.

The random access channel time domain resource in the random access channel resource set is a random access channel time domain resource configured on the fourth uplink bandwidth part.

The random access channel frequency domain resource in the random access channel resource set is a random access channel frequency domain resource configured on the fourth uplink bandwidth part.

Correspondingly, the sending module 1202 is specifically configured to:

send the random access preamble on the fourth uplink bandwidth part by using the random access channel resource.

The serving cell is a serving cell in which the user equipment sends the random access preamble.

Further, a public configuration of the serving cell includes a configuration of the first downlink bandwidth part and a configuration of the fourth uplink bandwidth part.

The public configuration of the serving cell is included in system information transmitted on the first downlink bandwidth part.

Further, a public configuration or a dedicated configuration of the serving cell includes a configuration of the first downlink bandwidth part and a configuration of the fourth uplink bandwidth part.

The public configuration of the serving cell is sent by the network device to the user equipment by using dedicated signaling.

Further, the processing module 1201 is further configured to:

when any one of the following conditions occurs, if an active uplink bandwidth part of the user equipment in the serving cell is a fifth uplink bandwidth part, activate the fourth uplink bandwidth part and deactivate the fifth uplink bandwidth part, or switch, by the user equipment, from the fifth uplink bandwidth part to the third uplink bandwidth part:

when a time alignment timer TAT associated with the serving cell of the user equipment expires;

when a quantity of times for which the user equipment sends a scheduling request reaches a maximum allowable transmission quantity;

when the user equipment receives signaling that is sent by the network device and that instructs the user equipment to initiate the random access process;

when the user equipment performs the random access process;

when the user equipment selects the random access preamble and the random access channel resource; and when the user equipment sends the random access preamble.

Further, the processing module 1201 is further configured to:

when any one of the following conditions occurs, if an active downlink bandwidth part of the user equipment in the serving cell is a second downlink bandwidth part, activate the first downlink bandwidth part and deactivate the second downlink bandwidth part, or switch, by the user equipment, from the second downlink bandwidth part to the first downlink bandwidth part:

when the time alignment timer TAT of the user equipment expires;

when the quantity of times for which the user equipment sends the scheduling request reaches the maximum allowable transmission quantity;

when the user equipment receives the signaling that is sent by the network device and that instructs the user equipment to initiate the random access process;

when the user equipment performs the random access process;

when the user equipment starts to receive the random access response message; and when the user equipment completes sending of the random access preamble.

Further, the processing module 1201 is specifically configured to:

if a first timer configured in the serving cell of the user equipment is running, stop the first timer, or stop and reset the first timer; where the first timer is used to: if the first timer expires, the user equipment activates a default downlink bandwidth part in the serving cell, or the user equipment switches from an active downlink bandwidth part to the default downlink bandwidth part in the serving cell.

Further, the processing module 1201 is further configured to:

start or restart the first timer when contention resolution in the random access process succeeds; or start or restart the first timer when the user equipment successfully receives the random access response message.

Further, if the random access is contention-based random access, the sending module 1202 is further configured to:

send a random access process message 3 on the fourth uplink bandwidth part; and the receiving module 1203 is further configured to:

receive, on the first downlink bandwidth part, a physical downlink control channel for scheduling retransmission of the random access process message 3 and transmission of a random access process message 4.

In an optional implementation, the sending module 1202 is further specifically configured to:

send the random access preamble on a sixth uplink bandwidth part by using the random access channel resource, where the random access preamble set is a random access preamble set configured on the sixth uplink bandwidth part;

the random access channel time domain resource in the random access channel resource set is a random access channel time domain resource configured on the sixth uplink bandwidth part; and the random access channel frequency domain resource in the random access channel resource set is a random access channel frequency domain resource configured on the sixth uplink bandwidth part.

Further, the sixth uplink bandwidth part is:

an initial uplink bandwidth part of the user equipment in a serving cell; or a first active uplink bandwidth part of the user equipment in the serving cell; or a default uplink bandwidth part of the user equipment in the serving cell; or an uplink bandwidth part configured or indicated by the network device for the user equipment by using dedicated signaling; where the serving cell is a serving cell in which the user equipment sends the random access preamble.

Further, if the random access process is a non-contention-based random access process, the sending module 1202 is further configured to:

perform uplink transmission on the sixth uplink bandwidth part, where a physical resource used for the uplink transmission is a physical resource indicated by an uplink grant in the random access response.

Figure 13:
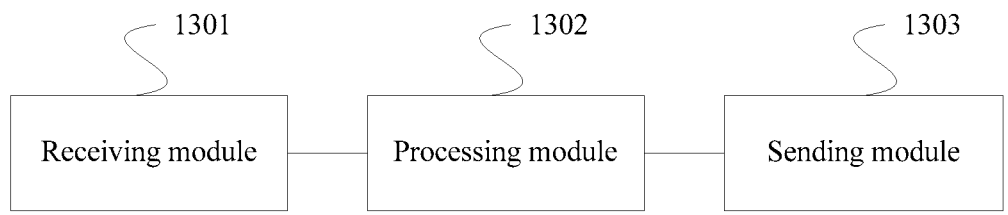
FIG. 13 is a structural diagram of modules of Embodiment 1 of a network device according to this application.

FIG. 13 is a structural diagram of modules of Embodiment 1 of a network device according to this application. As shown in FIG. 13, the network device includes a receiving module 1301, a processing module 1302, and a sending module 1303.

The receiving module 1301 is configured to receive a random access preamble sent by user equipment by using a random access channel resource, where the random access preamble is selected by the user equipment from a random access preamble set, and the random access channel resource is selected by the user equipment from a random access channel resource set.

The processing module 1302 sends a random access response to the user equipment on a first downlink bandwidth part by using the sending module 1303.

At least one of the random access preamble set or the random access channel resource set corresponds to the first downlink bandwidth part.

The random access channel resource includes at least one of a random access channel time domain resource or a random access channel frequency domain resource.

Further, the first downlink bandwidth part is a downlink bandwidth part that is active when the user equipment performs the random access process.

Further, that at least one of the random access preamble set or the random access channel resource set corresponds to the first downlink bandwidth part includes:

at least one of the random access preamble set and the random access channel resource set corresponds to a first control resource set of the first downlink bandwidth part, and the first control resource set indicates a time-frequency domain resource set used by the user equipment to receive or search for a downlink control channel; where the downlink control channel is used to schedule any downlink transmission and/or uplink transmission; or the downlink control channel is used to schedule at least one of transmission of a random access process message 2, retransmission of a random access process message 3, and transmission of a random access process message 4, where the random access process message 2 is a random access response message, the random access process message 3 is uplink transmission scheduled for the first time, and the random access process message 4 is a random access contention resolution message.

In an optional implementation, the sending module is further configured to:

send a first message to the user equipment, where the first message includes configuration information indicating a correspondence between the first downlink bandwidth part and a first uplink bandwidth part and includes random access information of the first uplink bandwidth part, or the first message includes configuration information indicating a correspondence between the first downlink bandwidth part and random access information and includes a first uplink bandwidth part corresponding to the random access information; where the random access information includes at least one piece of the following information:

first configuration information of random access that is used to indicate a random access channel frequency domain resource;

second configuration information of random access that is used to indicate a random access channel time domain resource; and third configuration information of random access that is used to indicate a random access preamble set.

Further, the random access information includes only the first configuration information.

Correspondingly, the random access channel frequency domain resource in the random access channel resource set is the random access channel frequency domain resource indicated by the first configuration information;

the random access channel time domain resource in the random access channel resource set is the same as a random access channel time domain resource configured on a second uplink bandwidth part of the user equipment; and the random access preamble set is the same as a random access preamble set configured on the second uplink bandwidth part of the user equipment.

Further, the random access information includes only the second configuration information.

Correspondingly, the random access channel time domain resource in the random access channel resource set is the random access channel time domain resource indicated by the second configuration information;

the random access channel frequency domain resource in the random access channel resource set is N physical resource blocks in a center of the first uplink bandwidth part, where N is a predefined positive integer; and the random access preamble set is the same as a random access preamble set configured on a second uplink bandwidth part of the user equipment.

Further, the random access information of the first uplink bandwidth part includes only the third configuration information.

Correspondingly, the random access preamble set is the random access preamble set indicated by the third configuration information;

the random access channel frequency domain resource in the random access channel resource set is N physical resource blocks in a center of the first uplink bandwidth part, where N is a predefined positive integer; and the random access channel time domain resource in the random access channel resource set is the same as a random access channel time domain resource configured on a second uplink bandwidth part of the user equipment.

Further, the random access information of the first uplink bandwidth part includes the first configuration information and the second configuration information.

Correspondingly, the random access channel frequency domain resource in the random access channel resource set is the random access channel frequency domain resource indicated by the first configuration information;

the random access channel time domain resource in the random access channel resource set is the random access channel time domain resource indicated by the second configuration information; and the random access preamble set is the same as a random access preamble set configured on a second uplink bandwidth part of the user equipment.

Further, the random access information of the first uplink bandwidth part includes the first configuration information and the third configuration information that are of random access.

Correspondingly, the random access channel frequency domain resource in the random access channel resource set is the random access channel frequency domain resource indicated by the first configuration information;

the random access preamble set is the random access preamble set indicated by the third configuration information of random access; and the random access channel time domain resource in the random access channel resource set is the same as a random access channel time domain resource configured on a second uplink bandwidth part of the user equipment.

Further, the random access information of the first uplink bandwidth part includes the second configuration information and the third configuration information.

Correspondingly, the random access channel time domain resource in the random access channel resource set is the random access channel time domain resource indicated by the second configuration information;

the random access preamble set is the random access preamble set indicated by the third configuration information; and the random access channel frequency domain resource in the random access channel resource set is N physical resource blocks in a center of the first uplink bandwidth part, where N is a predefined positive integer.

Further, the random access information of the first uplink bandwidth part includes the first configuration information, the second configuration information, and the third configuration information.

Correspondingly, the random access channel frequency domain resource in the random access channel resource set is the random access channel frequency domain resource indicated by the first configuration information;

the random access channel time domain resource in the random access channel resource set is the random access channel time domain resource indicated by the second configuration information; and the random access preamble set is the random access preamble set indicated by the third configuration information.

Further, the second uplink bandwidth part is:

an initial uplink bandwidth part of the user equipment in a serving cell; or a first active uplink bandwidth part of the user equipment in the serving cell; or a default uplink bandwidth part of the user equipment in the serving cell; or an uplink bandwidth part configured or indicated by the network device for the user equipment by using dedicated signaling; where the serving cell is a serving cell in which the user equipment sends the random access preamble.

Further, the receiving module 1301 is further configured to:

receive the random access preamble that is sent by the user equipment on the first uplink bandwidth part by using the random access channel resource.

In an optional implementation, the first downlink bandwidth part is a downlink bandwidth part corresponding to a fourth uplink bandwidth part of the user equipment.

The fourth uplink bandwidth part is an uplink bandwidth part that is of the user equipment in the serving cell and on which a random access preamble set and a random access channel resource set are configured.

The random access preamble set is the random access preamble set configured on the fourth uplink bandwidth part.

The random access channel time domain resource in the random access channel resource set is a random access channel time domain resource configured on the fourth uplink bandwidth part.

The random access channel frequency domain resource in the random access channel resource set is a random access channel frequency domain resource configured on the fourth uplink bandwidth part.

Correspondingly, the receiving module 1301 is further specifically configured to:

receive the random access preamble that is sent by the user equipment on the fourth uplink bandwidth part by using the random access channel resource.

Further, a public configuration of the serving cell includes a configuration of the first downlink bandwidth part and a configuration of the fourth uplink bandwidth part.

The public configuration of the serving cell is included in system information transmitted on the first downlink bandwidth part.

Further, a public configuration or a dedicated configuration of the serving cell includes a configuration of the first downlink bandwidth part and a configuration of the fourth uplink bandwidth part.

The public configuration of the serving cell is sent by the network device to the user equipment by using dedicated signaling.

In an optional implementation, the receiving module 1301 is further specifically configured to:

receive the random access preamble that is sent by the user equipment on a sixth uplink bandwidth part by using the random access channel resource; where the random access preamble set is a random access preamble set configured on the sixth uplink bandwidth part;

the random access channel time domain resource in the random access channel resource set is a random access channel time domain resource configured on the sixth uplink bandwidth part; and the random access channel frequency domain resource in the random access channel resource set is a random access channel frequency domain resource configured on the sixth uplink bandwidth part.

Figure 14:
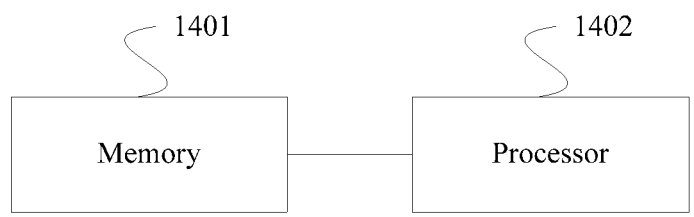
FIG. 14 is a block diagram of entities of user equipment according to this application.

FIG. 14 is a block diagram of entities of user equipment according to this application. As shown in FIG. 14, the user equipment includes a memory 1401 and a processor 1402.

The memory 1401 is configured to store a program instruction, and the processor 1402 is configured to invoke the program instruction in the memory 1401 to perform the functions of the user equipment in the foregoing method embodiment.

Figure 15:
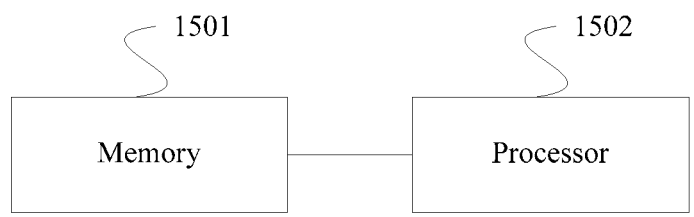
FIG. 15 is a block diagram of entities of a network device according to this application.

FIG. 15 is a block diagram of entities of a network device according to this application. As shown in FIG. 15, the network device includes a memory 1501 and a processor 1502.

The memory 1501 is configured to store a program instruction, and the processor 1502 is configured to invoke the program instruction in the memory 1501 to perform the functions of the network device in the foregoing method embodiment.

Figure 16:
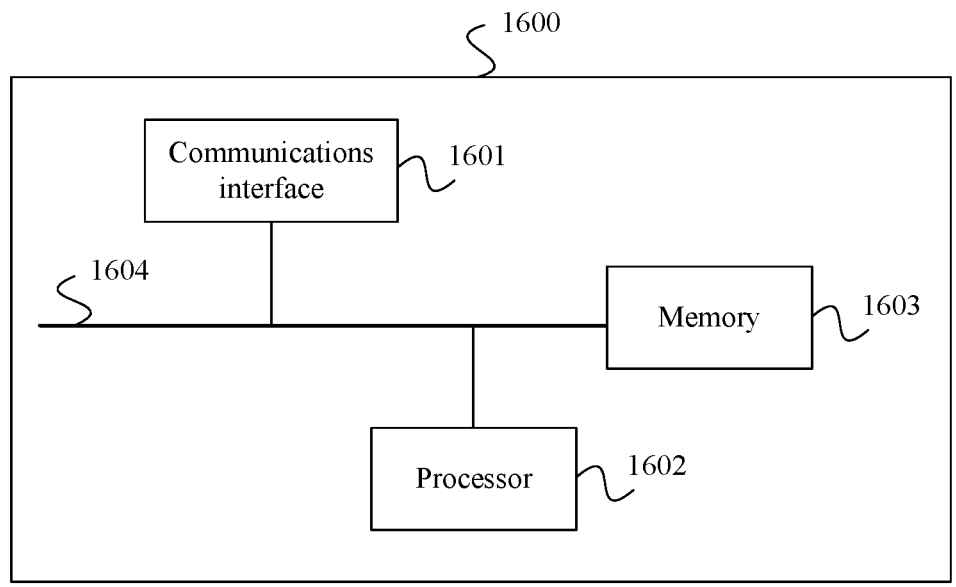
FIG. 16 is a block diagram of entities of a chip according to this application.

FIG. 16 is a block diagram of entities of a chip according to this application. The chip 1600 may be used for user equipment. As shown in FIG. 16, the chip includes at least one communications interface 1601, at least one processor 1602, and at least one memory 1603. The communications interface 1601, the processor 1602, and the memory 1603 are interconnected by using a circuit (or a bus in some cases) 1604, and the processor 1602 invokes an instruction stored in the memory 1603 to perform the functions of the user equipment in the foregoing method embodiment.

Figure 17:
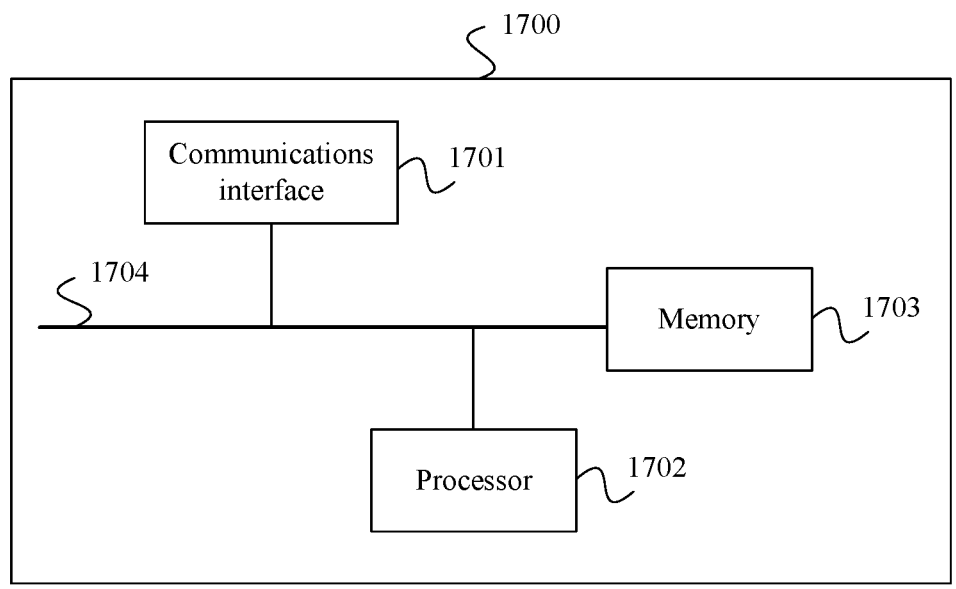
FIG. 17 is a block diagram of entities of a chip according to this application.

FIG. 17 is a block diagram of entities of a chip according to this application. The chip 1700 may be used for a network device. As shown in FIG. 17, the chip includes at least one communications interface 1701, at least one processor 1702, and at least one memory 1703. The communications interface 1701, the processor 1702, and the memory 1703 are interconnected by using a circuit (or a bus in some cases) 1704, and the processor 1702 invokes an instruction stored in the memory 1703 to perform the functions of the network device in the foregoing method embodiment.

The foregoing descriptions are only exemplary embodiments of the present application, but are not intended to limit the embodiments of the present application. Any modification, equivalent replacement, or improvement made within the spirit and principle of the embodiments of the present application shall all fall within the protection scope of the embodiments of the present application.

What is claimed is:

1. A random access method comprising:
    selecting, by user equipment, a random access preamble from a random access preamble set, and selecting a random access channel resource from a random access channel resource set;
    sending, by the user equipment, the random access preamble on an uplink bandwidth part by using the random access channel resource, wherein the uplink bandwidth part is an active uplink bandwidth part that the user equipment performs a random access procedure; and
    receiving, by the user equipment, a random access response message on a first downlink bandwidth part, wherein the first downlink bandwidth part corresponds to the uplink bandwidth part;
    wherein if the active downlink bandwidth part is a second downlink bandwidth part when the user equipment initiates the random access procedure, the method further comprises:
    switching, by the user equipment, from the second downlink bandwidth part to the first downlink bandwidth part.

2. The method according to claim 1, wherein the method further comprises:
    receiving, by the user equipment, a message from the network device, wherein the message comprises configuration information indicating a correspondence between the uplink bandwidth part and the first downlink bandwidth part.

3. The method according to claim 1, wherein the message further includes:
    first configuration information which indicates a location of a random access channel frequency domain resource;
    second configuration information which indicates a location of a random access channel time domain resource; and
    third configuration information which indicates the random access preamble set.

4. The method according to claim 1, wherein in response to the random access being contention-based access, the method further comprises:
    sending, by the user equipment, a random access process message 3 on the uplink bandwidth part; and
    receiving, by the user equipment, a first physical downlink control channel used for scheduling retransmission of the random access process message 3 and a second physical downlink control channel used for transmission of a random access process message on the first downlink bandwidth part.

5. A random access method comprising:
receiving, by a network device, a random access preamble on an uplink bandwidth part sent by a user equipment by using a random access channel resource, wherein the uplink bandwidth part is an active uplink bandwidth part that the user equipment performs a random access procedure, wherein the random access preamble is selected by the user equipment from a random access preamble set and the random access channel resource is selected by the user equipment from a random access channel resource set; and
sending, by the network device, a random access response message on the first downlink bandwidth part, wherein the first downlink bandwidth part corresponds to the uplink bandwidth part;
wherein the first downlink bandwidth part is switched to by the user equipment from the second downlink bandwidth part when the active downlink bandwidth part is a second downlink bandwidth part when initiating the random access procedure.

6. The method according to claim 5, wherein the message further includes:
first configuration information which indicates a location of a random access channel frequency domain resource;
second configuration information which indicates a location of a random access channel time domain resource; and
third configuration information which indicates the random access preamble set.

7. The method according to claim 5, wherein in response to the random access being contention-based access, the method further comprises:
receiving, by the network device, a random access process message 3 on the uplink bandwidth part; and
sending, by the network device, a first physical downlink control channel used for scheduling retransmission of the random access process message 3 and a second physical downlink control channel used for transmission of a random access process message on the first downlink bandwidth part.

8. An electronic device comprising:
at least one processor; and
at least one memory comprising instructions to be executed by the at least one processor, wherein the at least one processor executes the instructions that cause the electronic device to:
select a random access preamble from a random access preamble set, and select a random access channel resource from a random access channel resource set;
send the random access preamble on an uplink bandwidth part by using the random access channel resource, wherein the uplink bandwidth part is an active uplink bandwidth part that the user equipment performs a random access procedure; and
receive a random access response message on a first downlink bandwidth part, wherein the first downlink bandwidth part corresponds to the a bandwidth part;
wherein if the active downlink bandwidth part is a second downlink bandwidth part when the user equipment initiates the random access procedure, the instructions further cause the electronic device to:
switch from the second downlink bandwidth part to the first downlink bandwidth part.

9. The electronic device according to claim 8, wherein the instructions further cause the electronic device to:
receive a message from the network device, wherein the message includes configuration information indicating a correspondence between the uplink bandwidth part and the first downlink bandwidth part.

10. The electronic device according to claim 8, wherein the message further includes:
first configuration information which indicates a location of a random access channel frequency domain resource;
second configuration information which indicates a location of a random access channel time domain resource; and
third configuration information which indicates the random access preamble set.

11. The electronic device according to claim 8, wherein in response to the random access being contention-based access, the instructions further cause the electronic device to:
send a random access process message 3 on the uplink bandwidth part; and
receive a first physical downlink control channel used for scheduling retransmission of the random access process message 3 and a second physical downlink control channel used for transmission of a random access process message on the first downlink bandwidth part.

12. A network device comprising:
at least one processor; and
at least one memory comprising instructions to be executed by the at least one processor, wherein the at least one processor executes the instructions that cause the network device to:
receive a random access preamble on the uplink bandwidth part sent by a user equipment by using a random access channel resource, wherein the uplink bandwidth part is an active uplink bandwidth part that the user equipment performs a random access procedure, wherein the random access preamble is selected by the user equipment from a random access preamble set and the random access channel resource is selected by the user equipment from a random access channel resource set; and
send a random access response message on the first downlink bandwidth part;
wherein the first downlink bandwidth part corresponds to the uplink bandwidth part;
wherein the first downlink bandwidth part is switched to by the user equipment from the second downlink bandwidth part when the active downlink bandwidth part is a second downlink bandwidth part when initiating the random access procedure.

13. The network device according to claim 12, wherein the message further includes:
first configuration information which indicates a location of a random access channel frequency domain resource;
second configuration information which indicates a location of a random access channel time domain resource; and
third configuration information which indicates the random access preamble set.

14. The network device according to claim 12, wherein in response to the random access being contention-based access, the instructions further cause the device to:
receive a random access process message 3 on the uplink bandwidth part; and send a first physical downlink control channel used for scheduling retransmission of the random access process message 3 and a second physical downlink control channel used for transmission of a random access process message on the first downlink bandwidth part.

\* \* \* \* \*